(12) United States Patent
Alawsh et al.

(10) Patent No.: US 11,119,183 B2
(45) Date of Patent: Sep. 14, 2021

(54) SIGNAL EMITTER LOCATION DETERMINATION USING SPARSE DOA ESTIMATION BASED ON A MULTI-LEVEL PRIME ARRAY WITH COMPRESSED SUBARRAY

(71) Applicant: King Fahd University of Petroleum and Minerals, Dhahran (SA)

(72) Inventors: Saleh Ahmed Alawsh, Dhahran (SA); Ali Hussain Muqaibel, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/230,274

(22) Filed: Dec. 21, 2018

(65) Prior Publication Data

US 2020/0200861 A1 Jun. 25, 2020

(51) Int. Cl.
| | |
|---|---|
| *G01S 5/06* | (2006.01) |
| *G01S 1/02* | (2010.01) |
| *G01S 7/282* | (2006.01) |
| *G01S 13/87* | (2006.01) |

(52) U.S. Cl.
CPC .............. *G01S 5/06* (2013.01); *G01S 1/024* (2013.01); *G01S 7/282* (2013.01); *G01S 13/878* (2013.01)

(58) Field of Classification Search
CPC ... G01S 1/024; G01S 5/06; G01S 5/14; G01S 7/282; G01S 13/878; H04W 64/00
USPC ......................................................... 342/463
See application file for complete search history.

(56) References Cited

U.S. PATENT DOCUMENTS

| | | | | |
|---|---|---|---|---|
| 2003/0091120 A1* | 5/2003 | Noda | ................... | H04L 1/0058 375/264 |
| 2019/0154439 A1* | 5/2019 | Binder | ................... | G01S 15/08 |

FOREIGN PATENT DOCUMENTS

| | | |
|---|---|---|
| CN | 106972882 A | 7/2017 |
| CN | 107576953 A | 1/2018 |
| CN | 108872929 A * | 11/2018 |

OTHER PUBLICATIONS

Qiang Yang, Feb. 16, 2017, International Journal of Antennas and Propagation, vol. 2017, Article ID 6425067, pp. 1-2.*
Alawash, et al.; Multi-level prime array for sparse sampling; IET Digital Library; Feb. 12, 2018; Abstract Only; 3 Pages.
Bush, et al.; n-tuple coprime sensor arrays; The Journal of the Acoustical Society of America 142; Dec. 13, 2017; 7 Pages.

(Continued)

*Primary Examiner* — Harry K Liu
(74) *Attorney, Agent, or Firm* — Oblon, McClelland, Maier & Neustadt, L.L.P.

(57) ABSTRACT

A sparse DOA estimation is based on a multi-level prime arrays (MLPAs) as a general structure for coprime arrays. The array uses multiple uniform subarrays "or levels" where the number of antenna elements of the subarrays are pairwise coprime integers. The subarrays overlap only at their first antenna element by adjusting the inter-element spacing. By selecting the number of antennas of the subarrays and controlling the inter-element spacing, various MLPAs of different features can be constructed. The configuration that realizes the maximum number of unique lags is recommended because the DOF is upper bounded by the number of lags.

8 Claims, 32 Drawing Sheets

(56) References Cited

OTHER PUBLICATIONS

Qin, et al.; Generalized Coprime Array Configurations for Direction-of-Arrival Estimation; IEEE Transactions on Signal Processing, vol. 63, No. 6; Mar. 15, 2015; 14 Pages.
Liu, et al.; DOA estimation based on multi-resolution difference co-array perspective; Digital Signal Processing 62; Dec. 14, 2016; pp. 187-196; 10 Pages.
Qin, et al.; DOAestimationexploitingauniformlineararraywithmultiple co-prime frequencies; Signal Processing 130; pp. 37-46; Jun. 9, 2016; 10 Pages.
Pal, et al.; Nested Arrays: A Novel Approach to Array Processing With Enhanced Degrees of Freedom; IEEE Transactions on Signal Processing, vol. 58, No. 8; Aug. 2010; 15 Pages.
Liu, et al.; Super Nested Arrays: Linear Sparse Arrays With Reduced Mutual Coupling—Part I: Fundamentals; IEEE Transactions on Signal Processing, vol. 64, No. 15; Aug. 1, 2016; 16 Pages.
Liu, et al.; Super Nested Arrays: Linear Sparse Arrays With Reduced Mutual Coupling—Part II: Fundamentals; IEEE Transactions on Signal Processing, vol. 64, No. 15; Aug. 15, 2016; 15 Pages.
Vaidyanathan, et al.; Sparse Sensing With Co-Prime Samplers and Arrays; IEEE Transactions on Sigfnal Processing, vol. 59, No. 2; Feb. 2011; 14 Pages.

\* cited by examiner

SIGNAL EMITTER LOCATION DETERMINATION USING SPARSE DOA ESTIMATION BASED ON A MULTI-LEVEL PRIME ARRAY WITH COMPRESSED SUBARRAY

STATEMENT OF ACKNOWLEDGEMENT

The authors would like to acknowledge the support provided by the Deanship of Scientific Research (DSR) at King Fahd University of Petroleum & Minerals (KFUPM) for funding this work through project No. IN161015.

SUMMARY OF THE INVENTION

Field of the Invention

This invention relates to an antenna array system which comprises a multilevel prime array (MLPA) configuration, wherein the array configuration comprises multiple uniform linear subarrays, wherein the number of elements in the subarrays is a pairwise coprime integer. The inter-element spacing of each subarray overlaps the first antenna element of the subarray, the inter-element spacing of one subarray is compressed to optimize the MLPA configuration, and the inter-element spacing is compressed under fixed number of antennas (N) and a fixed aperture size (D). The invention further relates to a method of optimizing the antenna array system by maximizing the number of consecutive lags and minimizing the number of holes in a difference co-array. The invention further describes algorithms for optimizing the array which distinguish the invention over the prior art.

Discussion of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Antenna arrays have many applications including improved signal reception, interference mitigation, and direction-of-arrival (DOA) estimation. The DOA estimation accuracy depends on the signal characteristics at the array outputs, the array geometry, and the characteristics of the propagation medium. Uniform linear arrays (ULAs) with N antennas can estimate up to N−1 sources using subspace based algorithms such as MUSIC and ESPRIT. Recent works have been directed towards increasing the number of estimated sources or the degree-of-freedom (DOF) to be greater than the number of elements. Array configurations that rely on the difference co-array including minimum redundancy arrays, minimum hole arrays, coprime arrays, and nested arrays can achieve that. The difference co-array is defined as the set of pairwise differences of array physical element locations. The achievable DOF is determined by the properties of the difference co-array.

Minimum redundancy arrays (MRAs) and minimum hole arrays are nonuniform linear arrays generated respectively by maximizing the number of consecutive lags and minimizing the number of holes in the resulting difference co-array for a given number of antennas. Those arrays are constructed using computer search because there is no closed form expression for the antenna locations nor the achievable DOF. A structure array known as nested MRA is constructed by combining several MRAs. Unlike MRA, their nested configuration has closed form expressions for the antenna locations and the achievable DOF, and has no holes in the difference co-array. However, combining several MRAs requires large physical aperture size.

Two ULAs with $M_1$ and $M_2$ antenna elements spaced by $M_2$ and $M_1$ units respectively are used to construct the conventional coprime array where $M_1$ and $M_2$ are coprime integers and the unit inter-element spacing is half-wavelength. Coprime arrays has the ability to resolve $\mathcal{O}(M_1 M_2)$ sources using $M_1+M_2-1$ elements. The optimal coprime pair is the one that has values of $M_1$ and $M_2$ as close as possible; however, doubling the number of elements of one subarray is also possible. Also, coprime array with compressed inter-element spacing and with displaced subarrays have also been proposed to enhance the DOF. The mutual coupling effect and the aperture size are however increased because of the compression and the displacement respectively compared with the conventional coprime array. With compression, the inter-element spacing for one subarray is reduced while with displacement, a proper shift is introduced between the two subarrays. Instead of processing the entire coprime array, the complexity of the estimation process can be reduced by processing each subarray alone and then combine the results to reduce the ambiguities.

Nested arrays are constructed using collinearly dense and sparse uniform linear subarrays having $M_1$ and $M_2$ antenna elements respectively. The antennas in the dense array are spaced by a unit inter-element spacing. The antennas in the sparse subarray are spaced by $(M_1+1)$ units and the unit inter-element spacing is half-wavelength. Nested arrays always have a hole free difference co-array and its length can be maximized by properly selecting the number of elements in each subarray. Although the array suffers from the mutual coupling effect, nested arrays can resolve $\mathcal{O}(N^2)$ sources using $N=M_1+M_2$ antennas. The DOF was enhanced by increasing the separation between the dense and the sparse subarrays. Nested arrays have larger DOF compared with coprime arrays because the difference co-array for coprime arrays has some redundant or repeated lags. The redundant entries can be exploited to reduce the size of the estimation problem and consequently the complexity.

Array configurations using three linear subarrays were considered to improve the DOF. Using a coprime array collinear with a ULA, the number of consecutive lags was increased by properly selecting the location of the appended ULA, though large aperture size is required. In addition, using three overlapped ULAs with coprime inter-element spacing has also been proposed. The subarrays shared more than one antenna element. The use of a compressed nested array has also been proposed by appending another similar sparse subarray to the other side of the dense subarray. Consequently, the array has a total of $N=M_1+2M_2-1$ antenna elements. This array improves the DOF but at the expense of increased the number of antennas and the aperture size.

Generalizing the well-known array configurations such as nested arrays and coprime arrays to multi-level configurations has received more attention recently. To gain more from such generalization, the fourth order difference co-array statistics was exploited to increase the DOF based on coprime arrays and nested arrays. Also, nested arrays extended to multi-level have also been proposed. A fourth-level nested array with a 2qth-order difference co-array was developed for narrowband and wideband DOA estimation with q≥1 being a positive integer. A fourth-level nested array that can resolve $\mathcal{O}(N^4)$ sources has also been proposed. The use of a super nested array is a recently developed configuration of nested arrays. A second-order super nested array has been extended to a qth-order super nested array. Both configurations have the same features as the conventional nested array and proposed mainly to reduce the mutual coupling effect because the number of antenna pairs with minimum inter-element spacing is reduced. Another development was a generalized coprime array extended to multi-level generalized coprime array. The difference co-array was separated into sub-co-arrays spaced by a unit or multiple units of half-wavelength to improve the DOF.

Accordingly, it is one objective of the present disclosure to describe an MLPA configuration that uses multiple uniform linear subarrays and has closed form expressions for antenna locations and aperture size to achieve large DOFs. It is another objective of the present disclosure to describe MLPAC configurations having compressed the inter-element subarray spacing to realize hole free difference co-arrays using proper compression factor and the subarray selection.

SUMMARY OF THE INVENTION

The present invention embodies sparse DOA estimation based on a multi-level prime arrays (MLPAs) as a general structure for coprime arrays. The array uses multiple uniform subarrays "or levels" where the number of antenna elements of the subarrays are pairwise coprime integers. The subarrays overlap only at their first antenna element by adjusting the inter-element spacing. By selecting the number of antennas of the subarrays and controlling the inter-element spacing, various MLPAs of different features can be constructed. The configuration that realizes the maximum number of unique lags is recommended because the DOF is upper bounded by the number of lags. The MLPA configuration is further optimized in order to increase the DOF by compressing the inter-element spacing of one subarray but without scarifying the number of antennas nor the aperture size. A proper selected compression factor and a specific subarray can maximize the number of lags and leads to a hole free difference co-array. It has been shown that large number of sources can be detected based on MLPA configurations using sparse reconstruction and MUSIC algorithms. In addition, MLPA configurations with compression can resolve larger number of sources compared with MLPAs due to upgrading the number of lags.

One embodiment of the present invention provides a system for detecting and locating an RF emitter using direction finding techniques. The system includes an antenna array having a plurality of antenna elements, and a receiver, preferably phase coherent, preferably having a channel for each of the antenna elements. Frequency conversions are preferably carried out by the receiver in a phase coherent fashion across all the channels. The system optionally includes a signal recorder for recording emitter signals of interest received from a receiver in a search area via the antenna array and the receiver, and a memory for storing data records generated by the signal record module. The system preferably includes a signal separator for receiving data records and identifying channels, and a signal detector for analyzing each channel for the presence of a target signal. The system further preferably includes a locating module for direction finding and/or geolocating the signal.

The system may be installed, for example, in a ground vehicle or other suitable platform. The system may include a calibrator for the system, by measuring an antenna array response to incident electromagnetic radiation from a known source located at a known location.

Another embodiment of the present invention provides a method for detecting and locating an emitter in a search area using the apparatus and system described herein.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
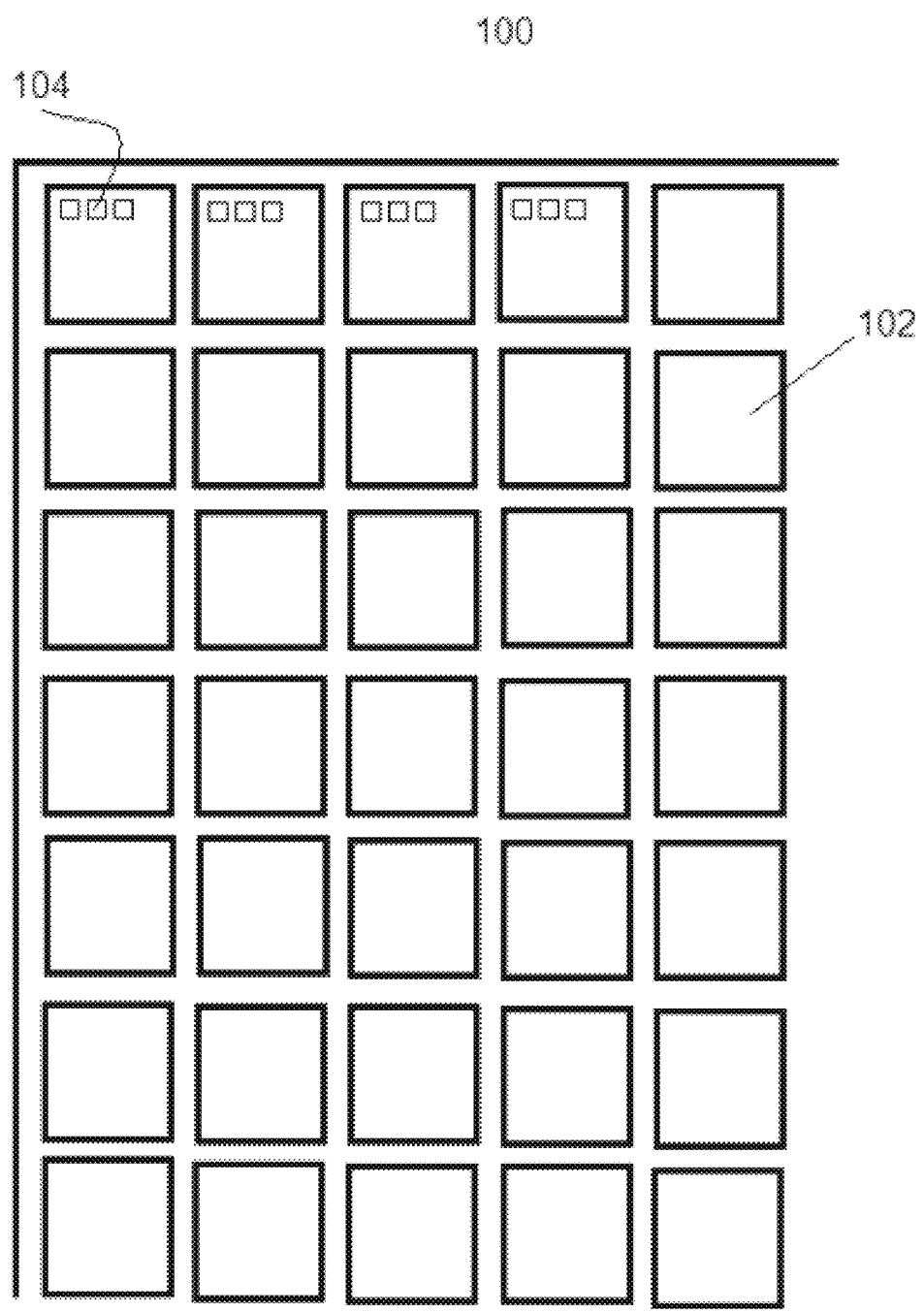
FIG. 1A shows a general block diagram illustration of an antenna array according to the present invention.

The embodiments of the present invention will be described herein below in conjunction with the above-described drawings.

The present disclosure includes a method for signal emitter location and an apparatus or system therefore. The method for determining the location of a signal emitter may be carried out on an apparatus or system that includes an antenna array that performs collects, receives and/or analyzes narrow band or wide band signals and/or carries out direction finding. Examples of the antenna array include but are not limited to a linear antenna array, a planar antenna array, and the like. The system preferably includes a receiver that functions to receive signals acquired by the antenna array and passes the signals to one or more of a channel profiler and the direction finder.

The channel profiler may include a space channel divider, a single space channel profiler and/or a post channel profiler 306. The spatial channel divider preferably processes the signals for each antenna element in the antenna array to form space channels which may be analyzed by the channel profiler and extract signal information necessary for one or more of signal emitter location finding and direction-finding. The post channel profiler may collect the signal information extracted by the single space channel profiler to provide profiles for all of the signals. The profiles for the signals may include signal properties such as time, frequency, space information, kind, statistical characteristic, shape, and the like of each signal.

An analyzer of the system subjects the signals and/or the signal profiles to an analysis algorithm to determine signal emitter location and/or direction finding by circuitry having instructions to do so. A pre-analyzer may preemptively process in signals based on the profiles that are produced by the channel profiler to produce pre-analyzed information for the target signals. In doing so the analyzer or pre-analyzer function to provide or analyze information necessary for correctly carrying out the signal emitter location determination and/or direction finding, for example, a center frequency, a bandwidth, an existence time, an existence space, a signal detection statistical property, a signal-specific characteristic and the like. The pre-analyzer may pre-analyze a specific signal to classify a modulation scheme or to extract a modulation characteristic, and the information thus classified and extracted may be utilized in direction finding by a direction finder.

The system may include a channelizer that extracts precise narrowband or broadband channels corresponding to emitter or antenna signals from the signals provided from the receiver. When extracting the narrowband channels, the narrowband channelizer preferably generates a delay time necessary to acquire the pre-analyzed information. Further, the narrowband channelizer may be capable of extracting separate narrowband channels with a good signal quality using the space channels of the wideband target signals.

A direction finding executor may be included to perform direction finding on the signals using the narrowband array antenna signals that are extracted by the channelizer. There is no special limitation to the direction finding algorithm as is well known to those skilled in the art.

A post analyzer is preferably used to process the results of the direction finding and/or the signal emitter location determination, and optionally the channels derived from the direction finder to produce a final analysis. For example, the final analysis may be achieved by using the profiles, pre-analyzed results and the direction finding results.

As shown in FIG. 1A, this invention, in at least a preferred embodiment, is directed to an array configuration 100 that combines multiple uniform linear subarrays 102 located along the x-axis. This array 100 is referred to as multi-level prime array (MLPA). Let $m=[M_1, M_2, \ldots, M_{N_p}]$ be a vector of $N_p$ pairwise coprime integers where $N_p$ represents the number of subarrays or the array level and $M_i$ represents the number of elements in the $i^{th}$ subarray for $i=1,2,\ldots,N_p$, assuming $M_i > M_j$, $\forall i > j$. The elements 104 of the $i^{th}$ subarray are spaced by multiple units of half-wavelength, $\mathcal{S}_i d$, where $\mathcal{S}_i \in m$ and $d=\lambda/2$ represents the unit inter-element spacing with $\lambda$ being the carrier wavelength. Therefore, the elements of the $i^{th}$ subarray are located at: $\mathbb{P} = k_i \mathcal{S}_i d$ where $0 \leq k_i \leq M_i - 1$. The inter-element spacing of all $N_p$ subarrays can be ordered and combined in a set of unique entries, $\mathbb{S} = \{\mathcal{S}_1, \mathcal{S}_2, \ldots, \mathcal{S}_{N_p}\} d$. The set contains all m entries scaled by d but with a different order such that $\mathcal{S}_i \neq M_i$. This set will be referred to as the ordered inter-element spacing of the array. Taking all $N_p$ levels into consideration, the array has antenna elements 104 positioned at:

$$\mathbb{P} = \bigcup_{i=1}^{N_p} \{k_i \mathcal{S}_i d \mid 0 \leq k_i \leq M_i - 1, \mathcal{S}_i \neq M_i\} \quad (1)$$

Moreover, the $i^{th}$ subarray is not allowed to be spaced by $M_i d$ and the ordered inter-element spacing is selected such that the subarrays share only the first antenna elements. Consequently, the total number of antenna elements 104 is given as:

$$N = \sum_{i=1}^{N_p} M_i - (N_p - 1) \quad (2)$$

For a given number of antenna elements 104, N, and MLPA level, $N_p$, there could be many m vectors that satisfy Equation (2). In addition, the ordered inter-element spacing for a given m can be arranged through different ways. Thus, several MLPA configurations can be constructed by controlling the ordered inter-element spacing. When the number of subarrays 102 are $N_p=2,3,4$, or 5, the arrays are referred to as a coprime array, 3LPA, 4LPA, and 5LPA, respectively. Higher MLPA levels can be also constructed which need a large N. One coprime array, two 3LPAs, four 4LPAs, and nine 5LPAs may be constructed for a given m by controlling the ordered inter-element spacing as shown in Table 1.

For example, a 3LPA with N=12 can be constructed using either $m_1=[3,4,7]$ or $m_2=[2,5,7]$. Based on each vector, two different 3LPAs can be constructed by setting the ordered inter-element spacing as $\mathbb{S}_1 = \{M_2, M_3, M_1\} d$ and $\mathbb{S}_2 = \{M_3, M_1, M_2\} d$ (see Table 1). Therefore, a total of four different 3LPA configurations can be constructed with N=12 antenna elements. The generalized MLPA covers special cases, such as a Pythagorean array (PA) which is a special case of the 3LPA configuration can be constructed when the entries of m are also primitive Pythagorean triple, $M_1^2 + M_2^2 = M_3^2$. In case of two subarrays ($N_p=2$), it becomes a coprime array.

Based on the way the MLPA is constructed, the aperture size is controlled by the inter-element spacing of $N_p^{th}$ subarray and the $(N_p-1)^{th}$ subarray in addition to the maximum value of their multipliers. Mathematically, the aperture size, D, can be expressed as:

$$D = \max(\mathcal{S}_{N_p-1}(M_{N_p-1}-1)d, \mathcal{S}_{N_p}(M_{N_p}-1)d) \quad (3)$$

This brings a necessary condition for any valid ordered inter-element spacing. A valid S should contain the $M_{N_p}$ and/or the $M_{N_p-1}$ entries of m scaled by d at the $(N_p-1)^{th}$ and the $N_p^{th}$ positions, respectively. All ordered inter-element spacing sets in Table 1 conform this condition.

Figure 1B:
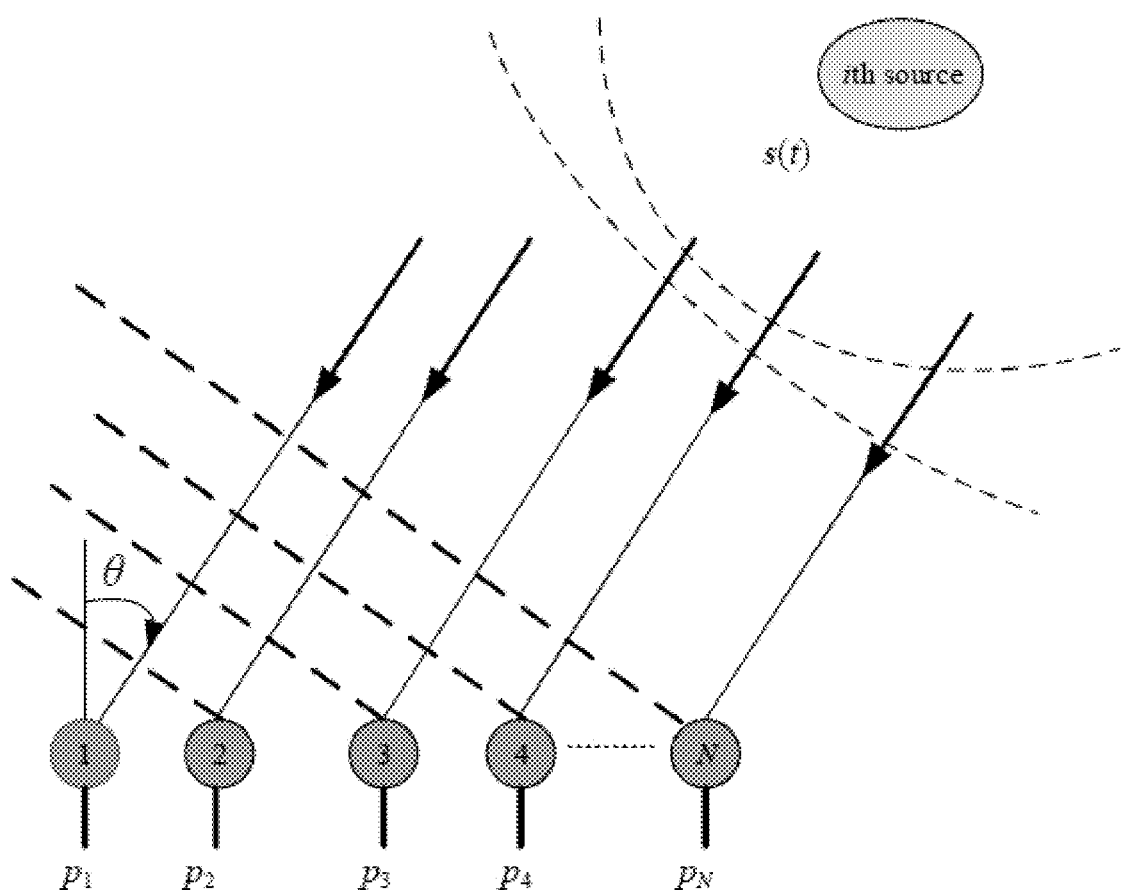
FIG. 1B illustrates a first embodiment of the system model for DOA estimation.

According to at least a first embodiment of the DOA signal model as shown in FIG. 1B, it can be assumed that there are K uncorrelated narrowband signals impinging on an array with N elements from DOAs $\theta=[\theta_1, \theta_2, \ldots, \theta_K]^T$. The received signal at the array output over L samples can be expressed as:

$$y(t_l) = A(\theta)s(t_l) + n(t_l) \quad l=1,2,\ldots,L \quad (4)$$

where $s(t_l)=[s_1(t_l),s_2(t_l), \ldots, s_K(t_l)]^T$ is the transmitted signal vector of size K×1, $A(\theta)$ is the steering matrix of size N×K, and $n(t_l)$ is the white Gaussian complex noise vector of size N×1 whose elements are assumed to be independent and identically distributed (i.i.d.) with zero-mean and variance $\sigma_n^2$. The received discretized signal is $y(t_l)=[y_1(t_l), y_2(t_l), \ldots, y_N(t_l)]^T$. Let $p=[p_1d, \ldots, p_Nd]^T, p_id \in \mathbb{P}$ denotes the position of the antenna elements 104 along the array axis with $p_1=0$ as a reference. When all sources are located in the far field, the steering vector can be expressed as:

$$a(\theta_i)=[1, \exp(j2\pi p_2 d \sin(\theta_i)/\lambda), \ldots, \exp(j2\pi p_N d \sin(\theta_i)/\lambda)]^T \quad (5)$$

The received signal can be written in a matrix format as:

$$Y=A(\theta)S+N \quad (6)$$

where $Y=[y(t_1), \ldots, y(t_L)]$, $N=[n(t_1), \ldots, n(t_L)]$ are matrices of size N×L and $S=[s(t_1),s(t_2), \ldots, s(t_L)]^T$ is a matrix of size K×L. When the noise is assumed to be uncorrelated with the signals, the covariance matrix of the received signal is given by:

$$R_{YY}=E[YY^H]=AR_{SS}A^H+\sigma_n^2 I_N \quad (7)$$

TABLE 1

The ordered inter-element spacing for different MLPA levels

| Configurations | | Coprime Array | 3LPA | 4LPA | 5LPA |
|---|---|---|---|---|---|
| Levels ($N_p$) | | 2 | 3 | 4 | 5 |
| m | | $[M_1, M_2]$ | $[M_1, M_2, M_3]$ | $[M_1, M_2, M_3, M_4]$ | $[M_1, M_2, M_3, M_4, M_5]$ |
| Inter-Element Spacing | $\mathbb{S}_1$ | $\{M_2, M_1\}d$ | $\{M_2, M_3, M_1\}d$ | $\{M_4, M_1, M_2, M_3\}d$ | $\{M_5, M_1, M_2, M_3, M_4\}d$ |
| | $\mathbb{S}_2$ | | $\{M_3, M_1, M_2\}d$ | $\{M_2, M_4, M_1, M_3\}d$ | $\{M_4, M_1, M_2, M_5, M_3\}d$ |
| | $\mathbb{S}_3$ | | | $\{M_2, M_1, M_4, M_3\}d$ | $\{M_3, M_1, M_5, M_2, M_4\}d$ |
| | $\mathbb{S}_4$ | | | $\{M_3, M_1, M_4, M_3\}d$ | $\{M_3, M_1, M_2, M_5, M_4\}d$ |
| | $\mathbb{S}_5$ | | | | $\{M_2, M_4, M_1, M_5, M_3\}d$ |
| | $\mathbb{S}_6$ | | | | $\{M_2, M_3, M_1, M_5, M_4\}d$ |
| | $\mathbb{S}_7$ | | | | $\{M_2, M_5, M_1, M_3, M_4\}d$ |
| | $\mathbb{S}_8$ | | | | $\{M_2, M_1, M_5, M_3, M_4\}d$ |
| | $\mathbb{S}_9$ | | | | $\{M_2, M_1, M_4, M_5, M_3\}d$ | where $R_{SS}=E[SS^H]=\text{diag}([\sigma_1^2,\sigma_2^2, \ldots, \sigma_K^2])$ represents the covariance matrix of the transmitted signal and $\sigma_i^2$ is the signal power of the $i^{th}$ source, $i=1,2, \ldots, K$. Given the received data Y and the array geometry, our objective is to come up with $\hat{\sigma}$ estimate. Usually, the matrix $R_{YY}$ is estimated as:

$$\hat{R}_{YY} = \frac{1}{L}\sum_{l=1}^{L} y(t_l)y^H(t_l) = \frac{1}{L}YY^H \quad (8)$$

The advantage of the array configuration according to the present invention is now demonstrated through its difference co-array. Considering an MLPA configuration 100 with N antenna elements 104, the pairwise differences of the array can be expressed as:

$$\mathbb{D} = \{p_i - p_j | p_i d, p_j d \in \mathbb{P}\} \quad (9)$$

The difference co-array, $\mathbb{D}_u$, is defined as the set of distinct or unique integers in the set D. Applications that rely on the correlation depend on all distinct virtual lags given by the difference co-array instead of just the element locations. Relying on the difference co-array gives the opportunity to estimate more sources greater than the total number of antenna elements. The achievable DOF which is a measure of the number of estimated sources is related to the number of unique lags in $\mathbb{D}_u$.

If $l_D$ is an integer number such that $l_D \in \mathbb{D}$, the weight function, $w(l_D)$, is defined as the number of occurrences of $l_D$ in $\mathbb{D}$. For example, based on the ordered inter-element spacing in a co-array. This brings a necessary condition for any valid ordered inter-element spacing. A valid $\mathbb{S}$ should contain the $M_{N_p}$ and/or the $M_{N_p-1}$ entries of m scaled by d at the $(N_p-1)^{th}$ and the $N_p^{th}$ positions respectively. All ordered inter-element spacing sets in Table 1 conform this condition.

Two configurations can be constructed for 3LPA with N=16 antennas using m=[4,5,9]. Considering the one with $\mathbb{S}_2=\{M_3, M_1, M_2\}d$, the array structure and the corresponding weight functions are plotted in FIG. 2. It is evident that the difference co-array is symmetric around the origin. The number of unique lags, $l_u$, achieved by the 3LPA is 69 and the number of consecutive lags, $l_c$, is 57. There are few missing lags (holes) in addition to some redundant lags as demonstrated by the weight function. Consequently, there is still a chance for improvement to modify the MLPA in order and realize larger DOF.

The DOF of the MLPA can be enhanced by compressing the inter-element spacing. The objective of the present invention is to do compression under a fixed number of antennas and a fixed aperture size. Therefore, one of the two subarrays in a configuration according to Equation (3) that affects the number of antennas or the aperture size is excluded. If the $i^{th}$ entry in m can be factored into two integers c and $\check{M}_i$, that is $M_i=c\check{M}_i$, then the inter-element spacing of the subarray spaced by $\mathbb{S}_i d=M_i d$ can be compressed by a factor c. When $M_i$ is a prime number, then it can divide only $c=M_i$. Since m contains pairwise coprime integers, $\check{M}_i$ also coprime with all remaining entries of m.

Given an optimized MLPA, the objective of the present invention is to find the proper subarray to be compressed and the value of the compression factor that increases the number of consecutive lags which is a function of m and $\mathbb{S}$.

The optimization function can be expressed as:

$$(M_i, c) \leftarrow \underset{M_i, c \in \mathbb{N}^+}{\operatorname{argmax}} \{l_c(m, \mathbb{S})\} \quad (10)$$

subject to:

$$M_i = c\,\check{M}_i, \forall\, i \in \{1, 2, \ldots, N_p\}$$

$$D = \max\left(\mathbb{S}_{N_p-1}(M_{N_p-1}-1)d, \mathbb{S}_{N_p}(M_{N_p}-1)d\right)$$

$$N = \sum_{i=1}^{N_p} M_i - (N_p - 1)$$

The optimized compressed subarray results in larger number of consecutive lags and consequently larger number of unique lags in the difference co-array. It can also result in hole free difference co-array where all lags become unique and consecutive. The achievable DOF of the MLPA can be also enhanced by increasing the number of unique lags which is equivalent to minimizing the number of missing lags or "holes" in the difference co-array. Let $\mathbb{H}$ be a set of all missing lags or holes in $\mathbb{D}_u$. The optimal value of c is the one that generates maximum possible new unique lags in $\mathbb{D}_u$ at the missing lag locations. Alternatively, this can be expressed as:

$$c = \underset{c}{\operatorname{argmin}} |\mathbb{H}| \quad (11)$$

where $|\mathbb{H}|$ denotes the cardinality. In this case, minimizing the number of holes will increase the number of unique lags and will not necessary increase the number of consecutive lags.

The resultant array is referred to as MLPA with compressed subarray (MLPAC). Two digits can be added at the end of "MLPACxx" for notation purposes where the first one indicates the $i^{th}$ compressed subarray and the other indicates the compression factor. The ordered inter-element spacing of the proposed MLPAC is the same as the corresponding MLPA except that the inter-element spacing of the compressed subarray becomes $\mathbb{S}_{MLPAC}(i)=(1/c)\mathbb{S}_{MLPA}(i)$. The inter-element spacing of the $i^{th}$ compressed subarray can be expressed as:

$$\check{\mathbb{S}}_i d = \check{M}_i d = \mathbb{S}_i d/c \quad (12)$$

Therefore, the antenna elements of the $i^{th}$ compressed subarray are located at:

$$\check{\mathbb{P}}_i = \bigcup_{k=0}^{M_i-1} \{k\check{\mathbb{S}}_i d \mid \check{\mathbb{S}}_i = \mathbb{S}_i/c, \mathbb{S}_i \neq M_i\} \quad (13)$$

After compression, the generated lags from the compressed subarray and the remaining subarrays can be written as:

$$\mathbb{L} =_{p_i - \check{p}_j, j \neq i} \quad (14)$$

where $\check{p}_j d \in \check{\mathbb{P}}_j$, $\check{\mathbb{P}}_j = \mathbb{P}_j/c, j \in \{1,2,\ldots,N_p\}$, and $p_i d \in \mathbb{P}_i$ for all $i \in \{1,2,\ldots,N_p\}\backslash j$. There are three possible scenarios for Equation (11). No improvement is achieved in the difference co-array when $\mathbb{L} \subseteq \mathbb{P}$. In this case, the value of the compression factor does not generate any new lags. In the second scenario, the value of the compression factor partially improves the difference co-array, i.e. $\mathbb{L} \subset \mathbb{P}$. The best scenario is realized when $\mathbb{L} \nsubseteq \mathbb{P}$ and $\mathbb{L} = \mathbb{H}$ where the MLPC achieves hole free difference co-array.

Figure 2A:
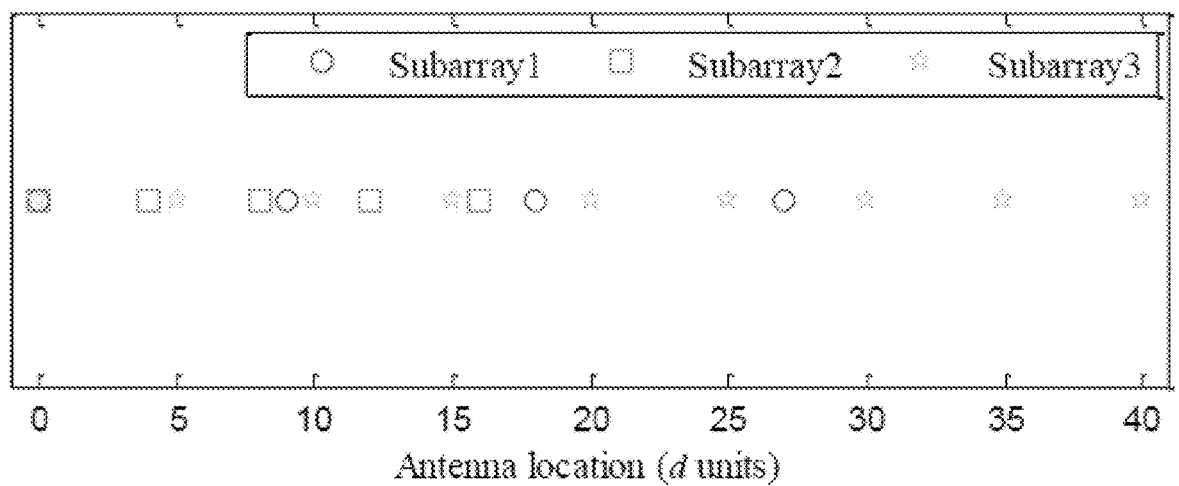
FIG. 2A illustrates MLPAC antenna location configurations 3LPA with a compressed 1st subarray according to the present invention.
Figure 2B:
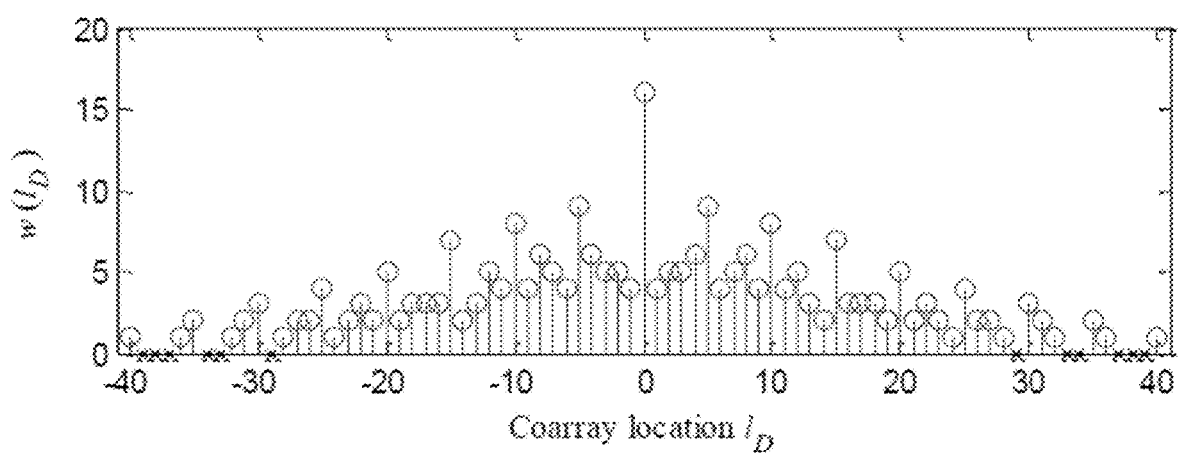
FIG. 2B illustrates MLPAC co-array location configurations 3LPA with a compressed 1st subarray according to the present invention.
Figure 2C:
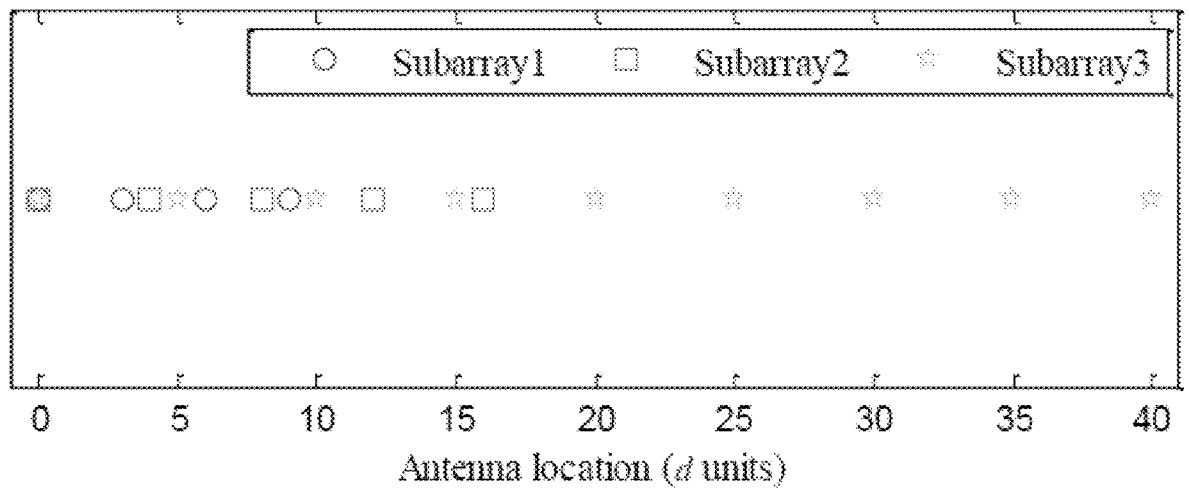
FIG. 2C illustrates MLPAC antenna location configurations 3LPAC13 with a compressed 1st subarray according to the present invention.

As an example, FIG. 2A and B show the 3LPA configuration with m=[4,5,9] and ordered inter-element spacing $\mathbb{S}_2=\{M_3, M_1, M_2\}d$. According to Equation (3), the required aperture size becomes D=max $(M_1(M_2-1),M_2(M_3-1))=M_2(M_3-1)$. It is evident that the third subarray controls D. Two configurations can be constructed for 3LPA with N=16 antennas using m=[4,5,9]. One configuration is $\mathbb{S}_2=\{M_3, M_1, M_2\}d$. The array structure and the corresponding weight functions are plotted in FIG. 2(a). It is evident that the difference co-array is symmetric around the origin. The number of unique lags, $l_u$, achieved by the 3LPA is 69 and the number of consecutive lags, $l_c$, is 57. There are few missing lags (holes) in addition to some redundant lags as demonstrated by the weight function. Consequently, there is still a chance for improvement and this motivates us to modify the MLPA in order to realize larger DOF.

Figure 2D:
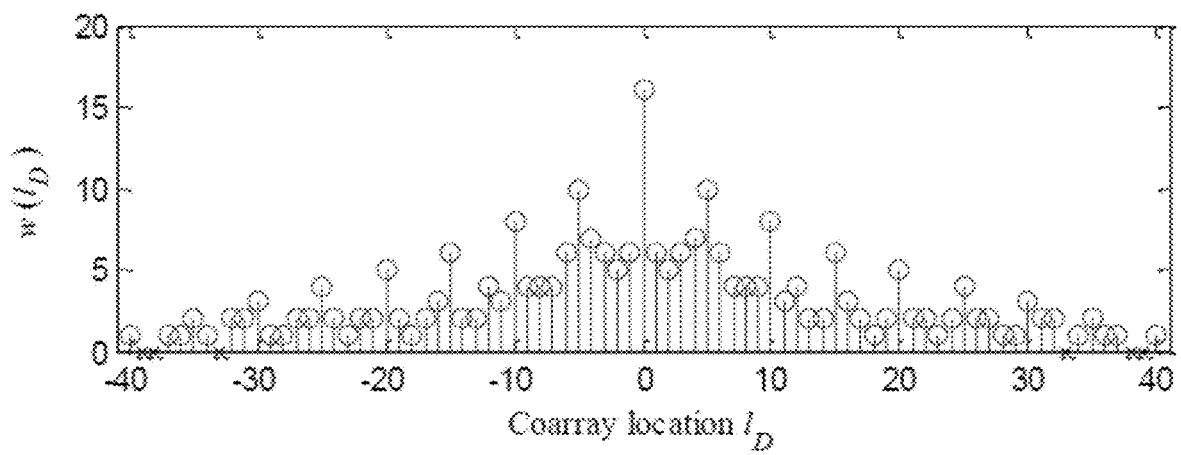
FIG. 2D illustrates MLPAC co-array location configurations 3LPAC13 with a compressed 1st subarray according to the present invention.
Figure 2E:
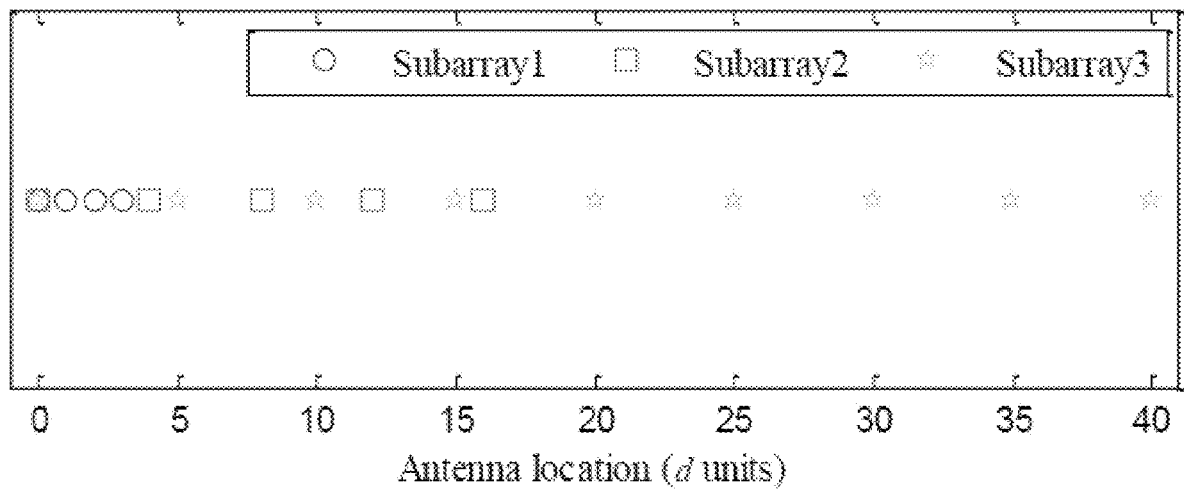
FIG. 2E illustrates MLPAC co-array location configurations 3LPAC19 with a compressed 2nd subarray according to the present invention.
Figure 2F:
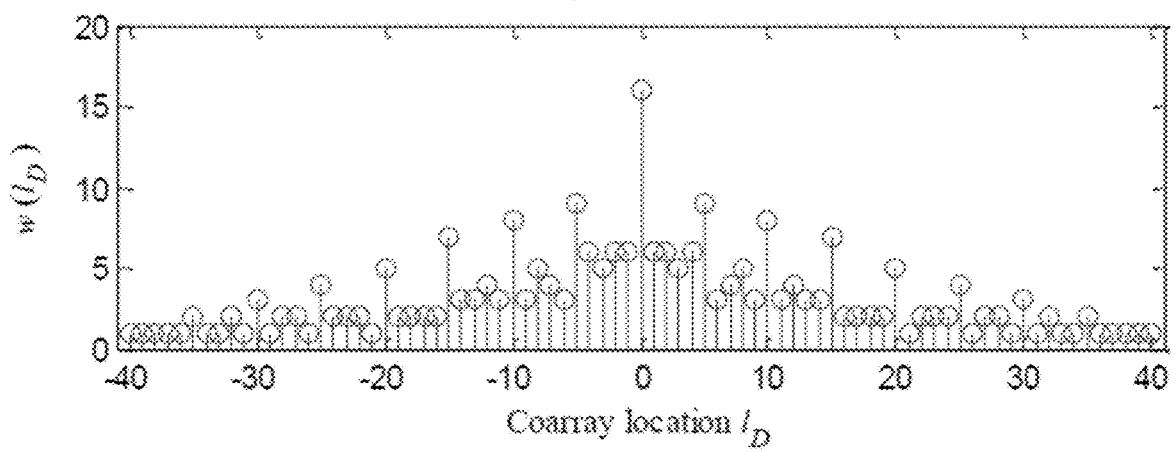
FIG. 2F illustrates MLPAC co-array location configurations 3LPAC19 with a compressed 2nd subarray according to the present invention.
Figure 2G:
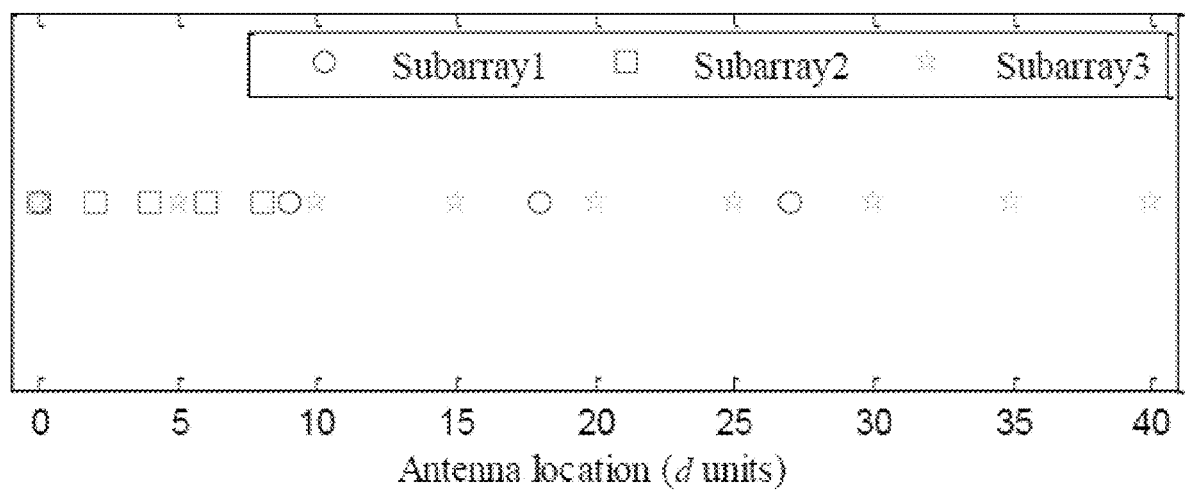
FIG. 2G illustrates MLPAC co-array location configurations 3LPAC22 with a compressed 2nd subarray according to the present invention.
Figure 2H:
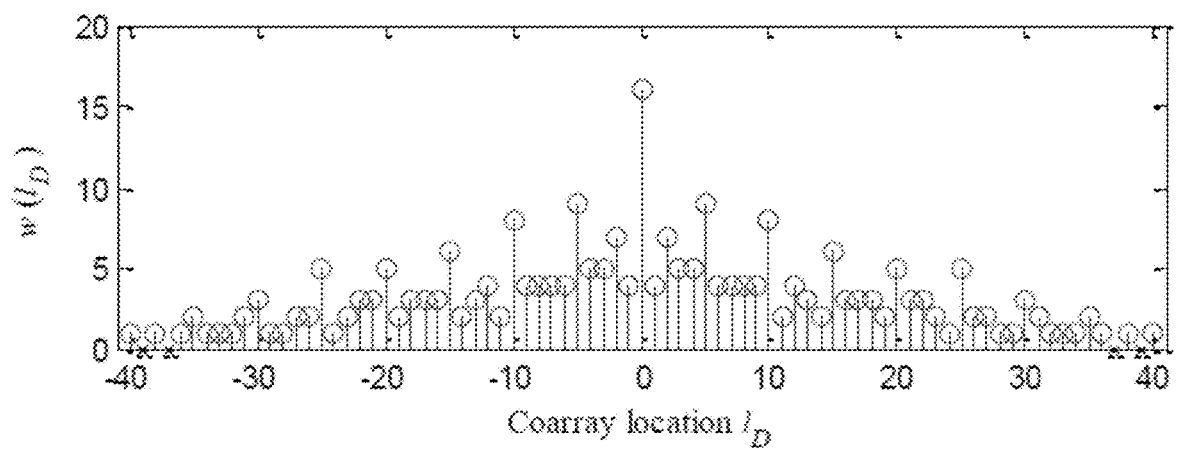
FIG. 2H illustrates MLPAC co-array location configurations 3LPAC22 with a compressed 2nd subarray according to the present invention.
Figure 2I:
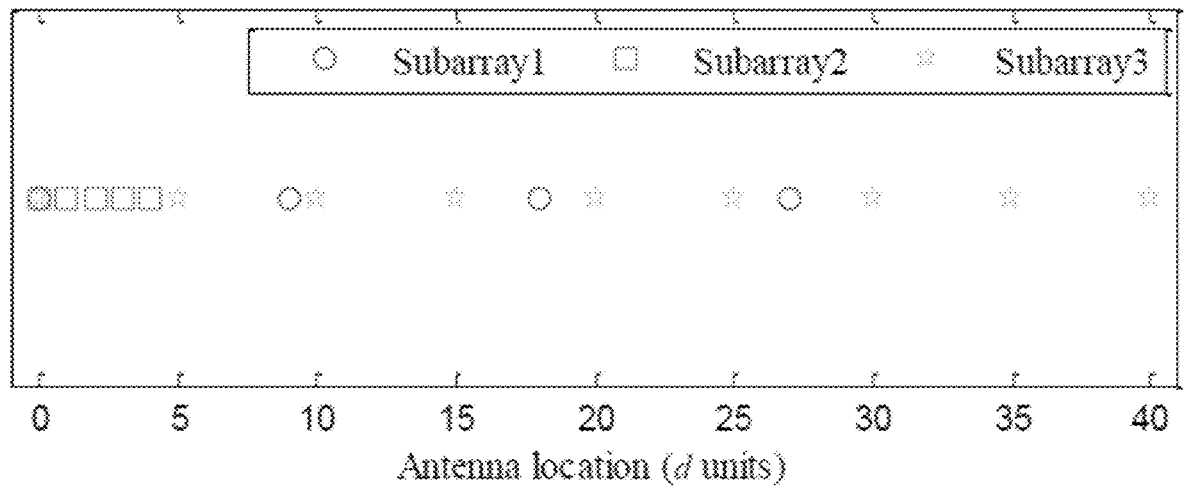
FIG. 2I illustrates MLPAC co-array location configurations 3LPAC24 with a compressed 2nd subarray according to the present invention.
Figure 2J:
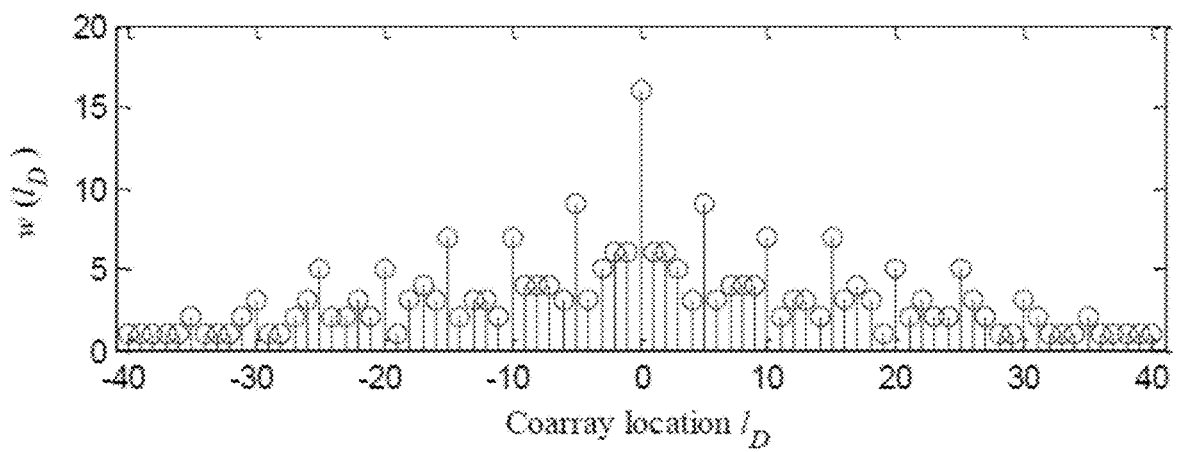
FIG. 2J illustrates MLPAC co-array location configurations 3LPAC24 with a compressed 2nd subarray according to the present invention.
Figure 3A:
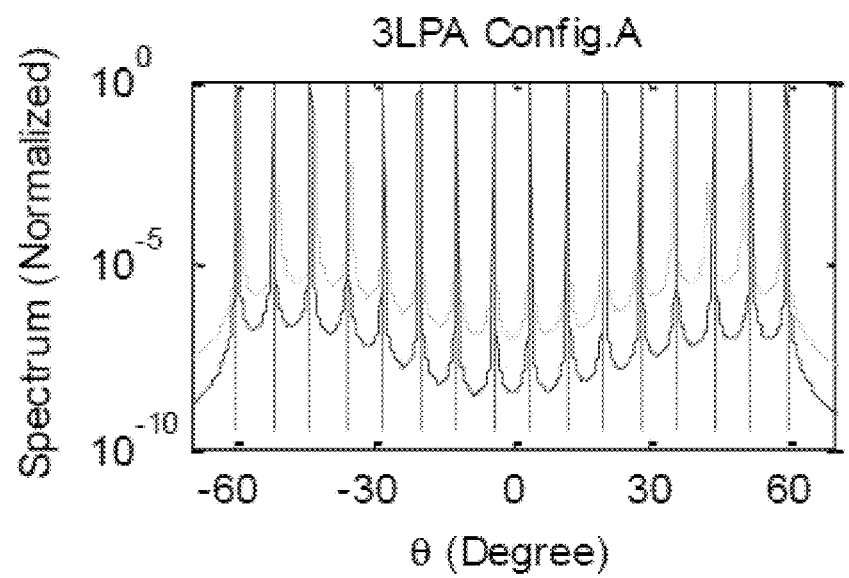
FIG. 3A illustrates estimated spatial spectra for 3LPA configuration using MUSIC (dashed lines) and Lasso (solid lines) for 3LPA, 3LPAC, PA, and PAC configurations using N=10 and with K=16.
Figure 3B:
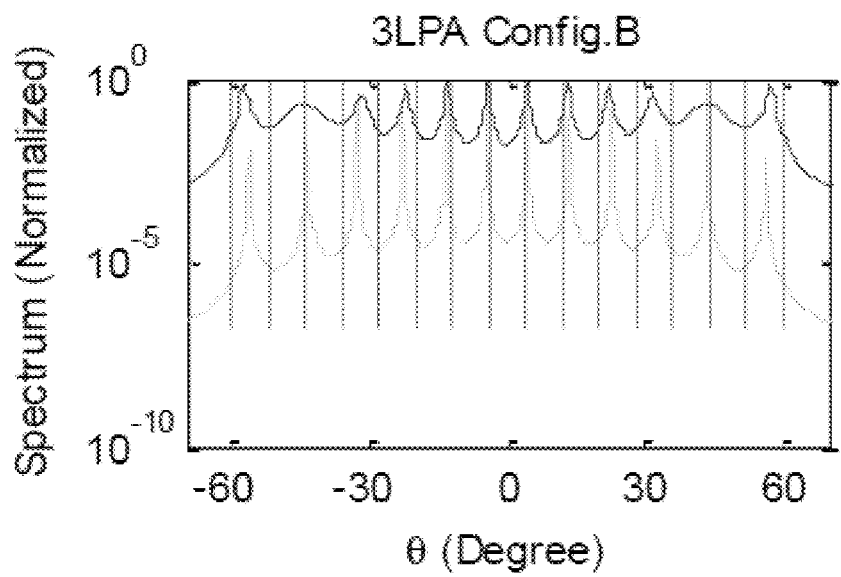
FIG. 3B illustrates estimated spatial spectra for 3LPA configurations using MUSIC (dashed lines) and Lasso (solid lines) for 3LPA, 3LPAC, PA, and PAC configurations using N=10 and with K=16.
Figure 3C:
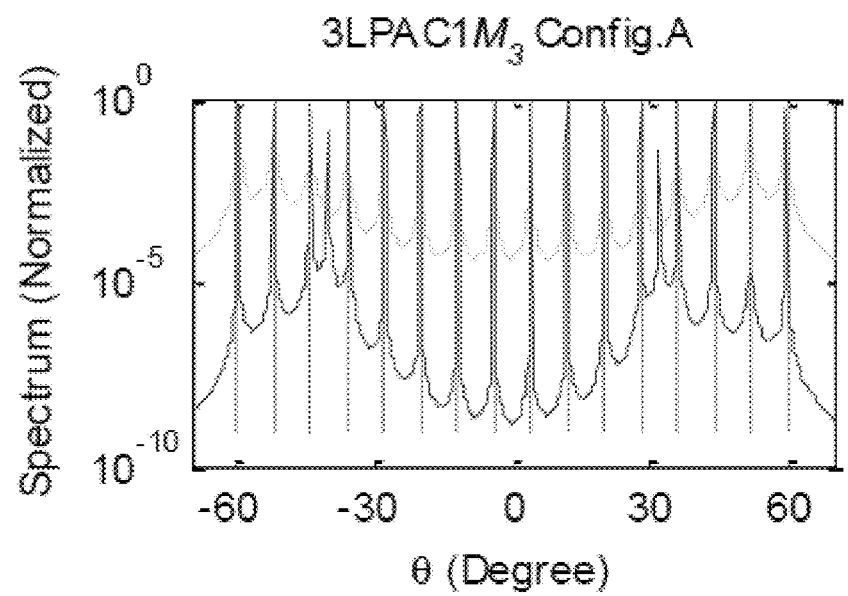
FIG. 3C illustrates estimated spatial spectra for 3LPAC2M1 configurations using MUSIC (dashed lines) and Lasso (solid lines) for 3LPA, 3LPAC, PA, and PAC configurations using N=10 and with K=16.
Figure 3D:
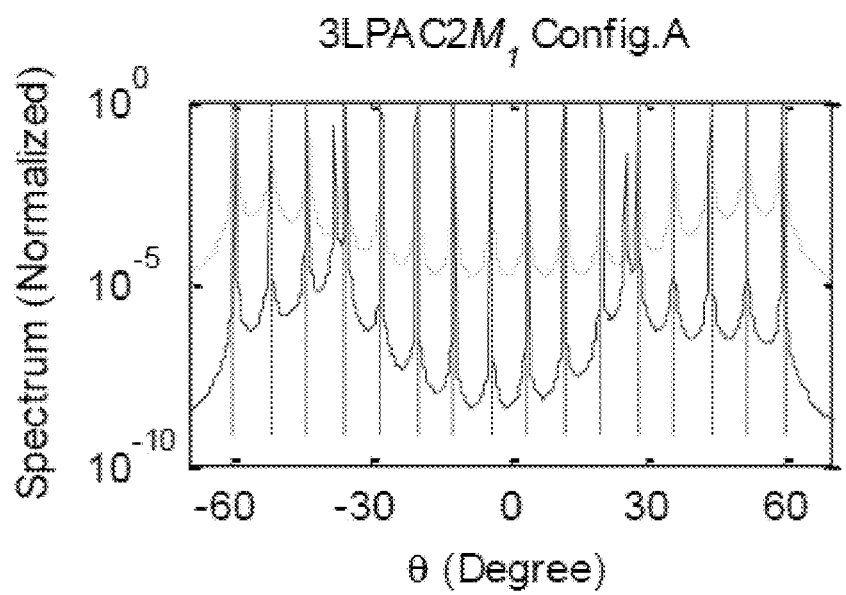
FIG. 3D illustrates estimated spatial spectra for 3LPAC2M3 configurations using MUSIC (dashed lines) and Lasso (solid lines) for 3LPA, 3LPAC, PA, and PAC configurations using N=10 and with K=16.
Figure 3E:
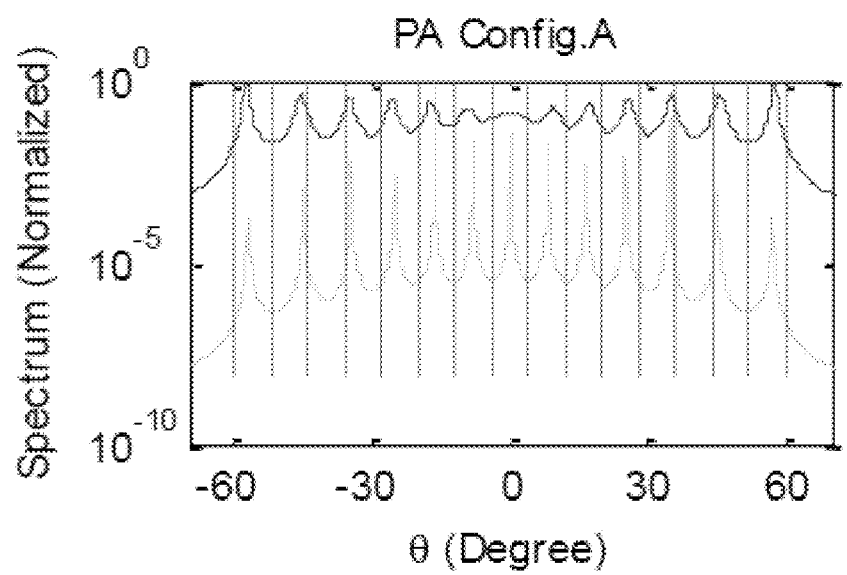
FIG. 3E illustrates estimated spatial spectra for PA configurations using MUSIC (dashed lines) and Lasso (solid lines) for 3LPA, 3LPAC, PA, and PAC configurations using N=10 and with K=16.
Figure 3F:
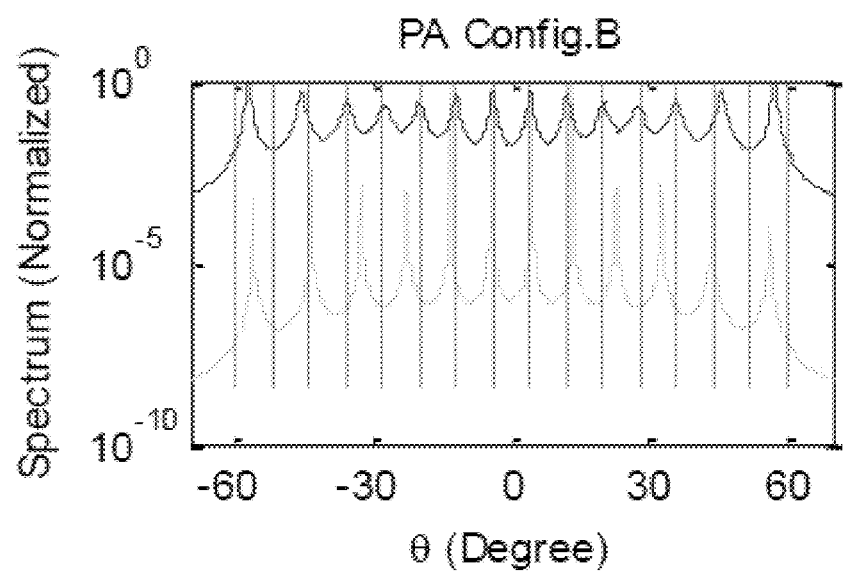
FIG. 3F illustrates estimated spatial spectra for PA configurations using MUSIC (dashed lines) and Lasso (solid lines) for 3LPA, 3LPAC, PA, and PAC configurations using N=10 and with K=16.
Figure 3G:
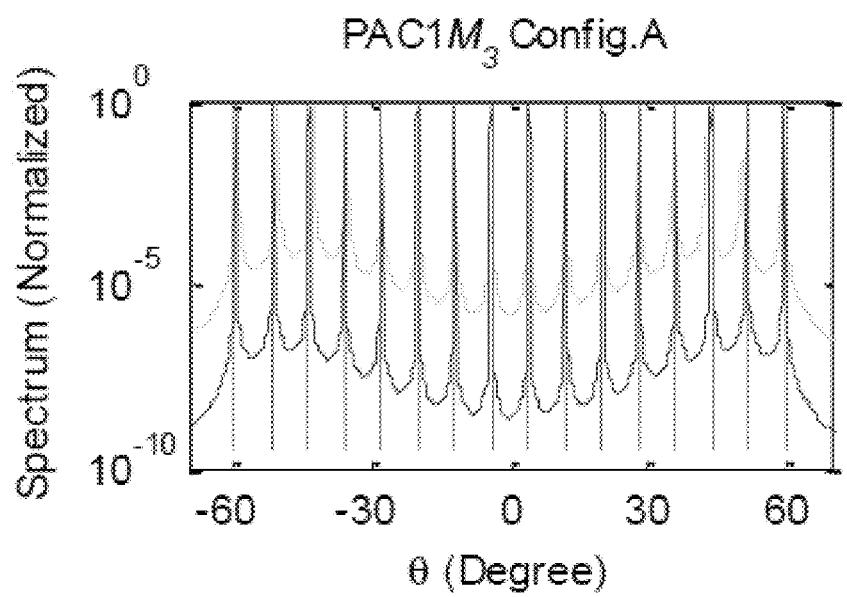
FIG. 3G illustrates estimated spatial spectra for 3LPAC1M3 configurations using MUSIC (dashed lines) and Lasso (solid lines) for 3LPA, 3LPAC, PA, and PAC configurations using N=10 and with K=16.
Figure 3H:
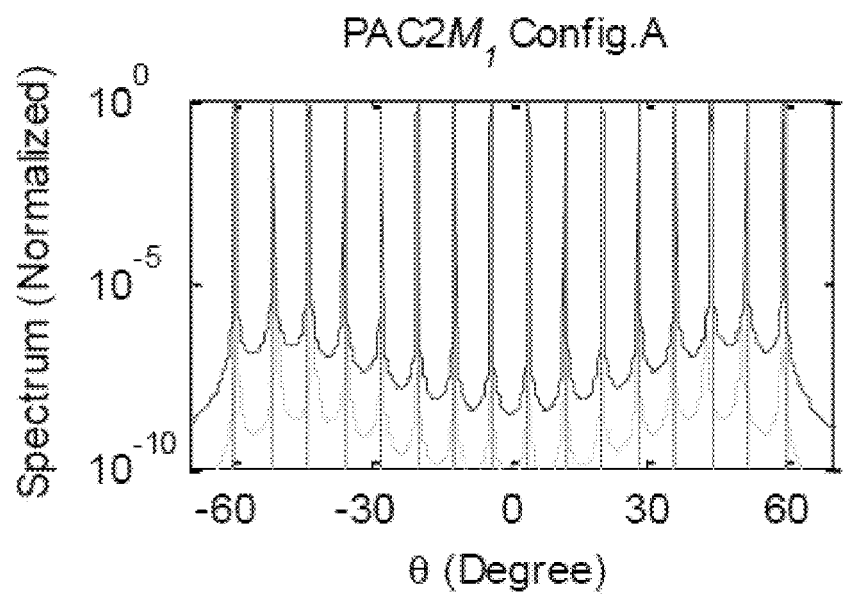
FIG. 3H illustrates estimated spatial spectra for 3LPAC2M configurations using MUSIC (dashed lines) and Lasso (solid lines) for 3LPA, 3LPAC, PA, and PAC configurations using N=10 and with K=16.
Figure 3I:
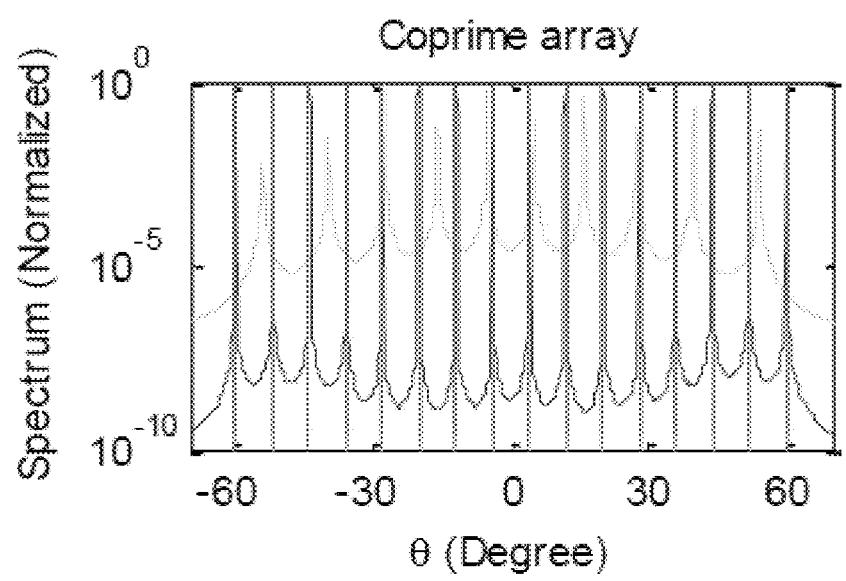
FIG. 3I illustrates estimated spatial spectra for coprime configurations.
Figure 4A:
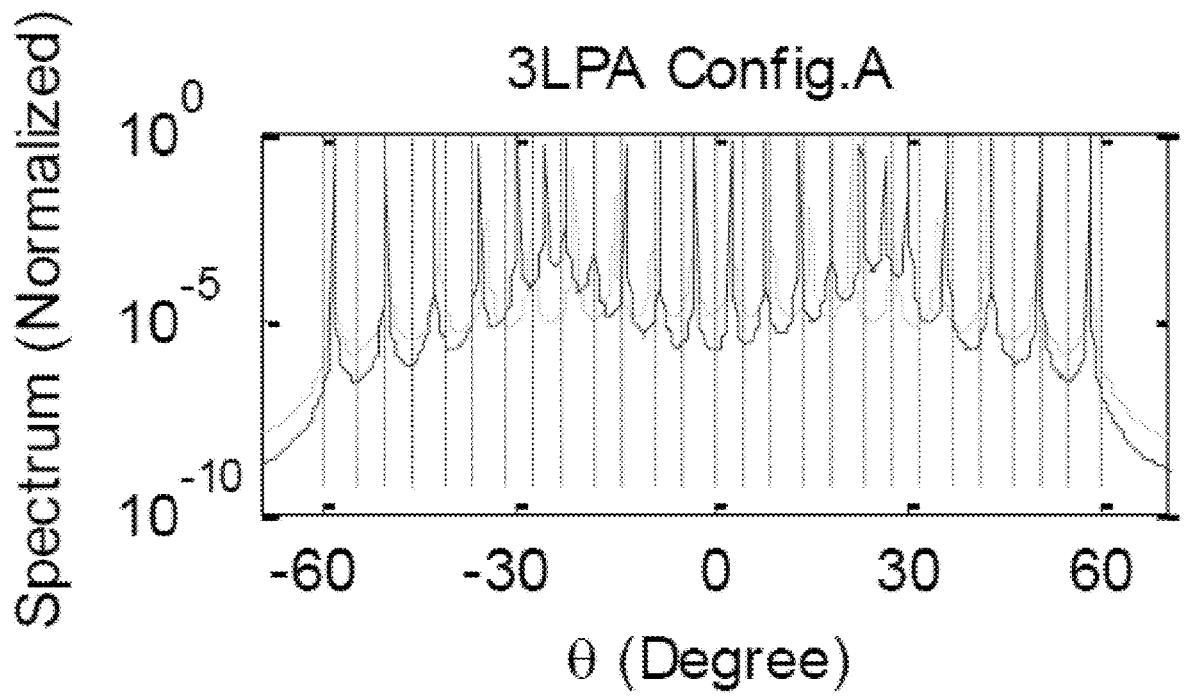
FIG. 4A illustrates estimated spatial spectra estimated for 3LPA configurations using MUSIC (dashed lines) and Lasso (solid lines) for 3LPA and 3LPAC configurations using N=12 and with K=27.
Figure 4B:
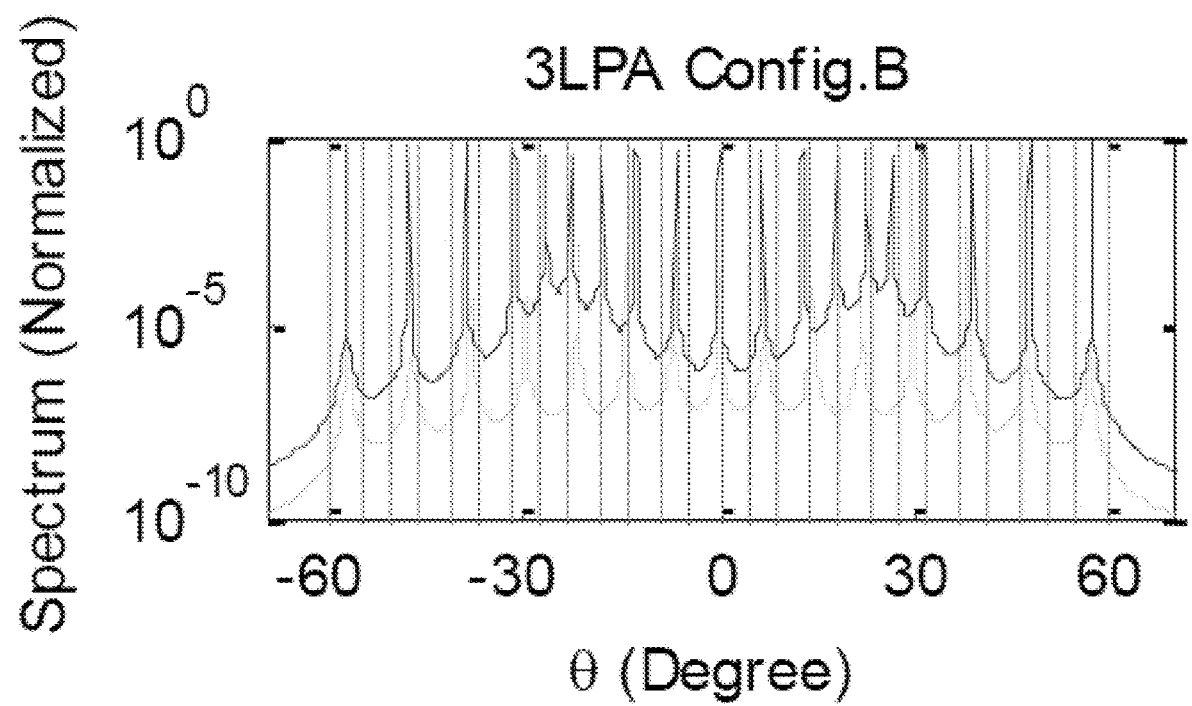
FIG. 4B illustrates estimated spatial spectra estimated for 3LPA configurations using MUSIC (dashed lines) and Lasso (solid lines) for 3LPA and 3LPAC configurations using N=12 and with K=27.
Figure 4C:
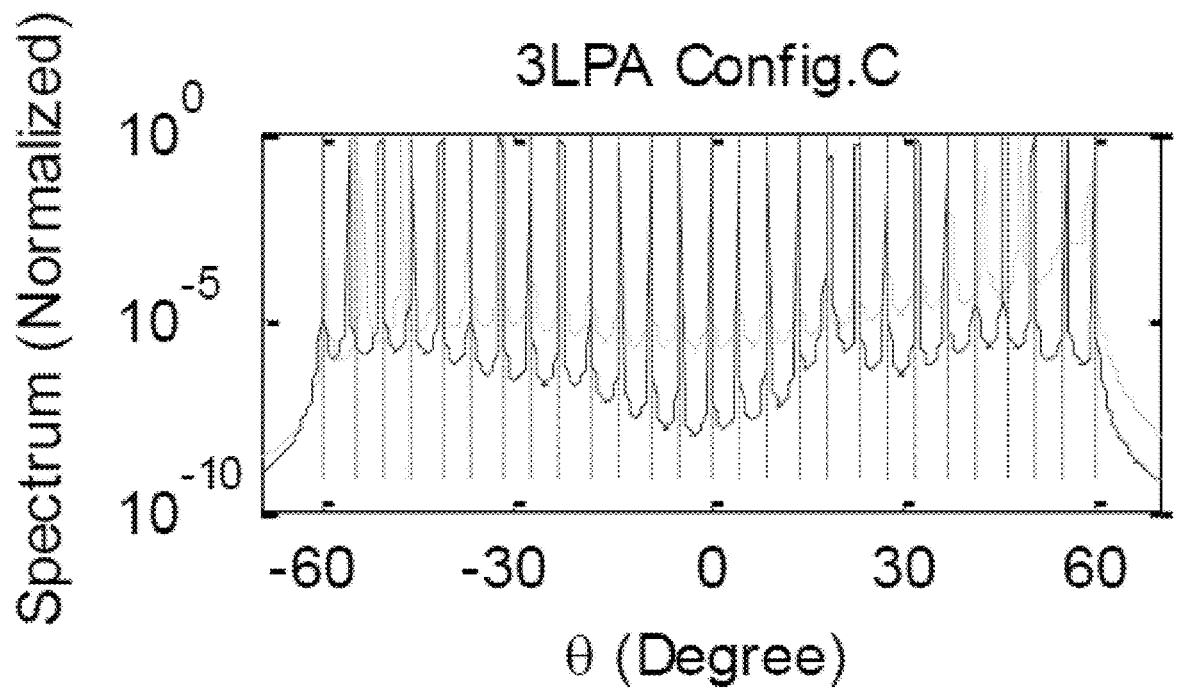
FIG. 4C illustrates estimated spatial spectra estimated for 3LPA configurations using MUSIC (dashed lines) and Lasso (solid lines) for 3LPA and 3LPAC configurations using N=12 and with K=27.
Figure 4D:
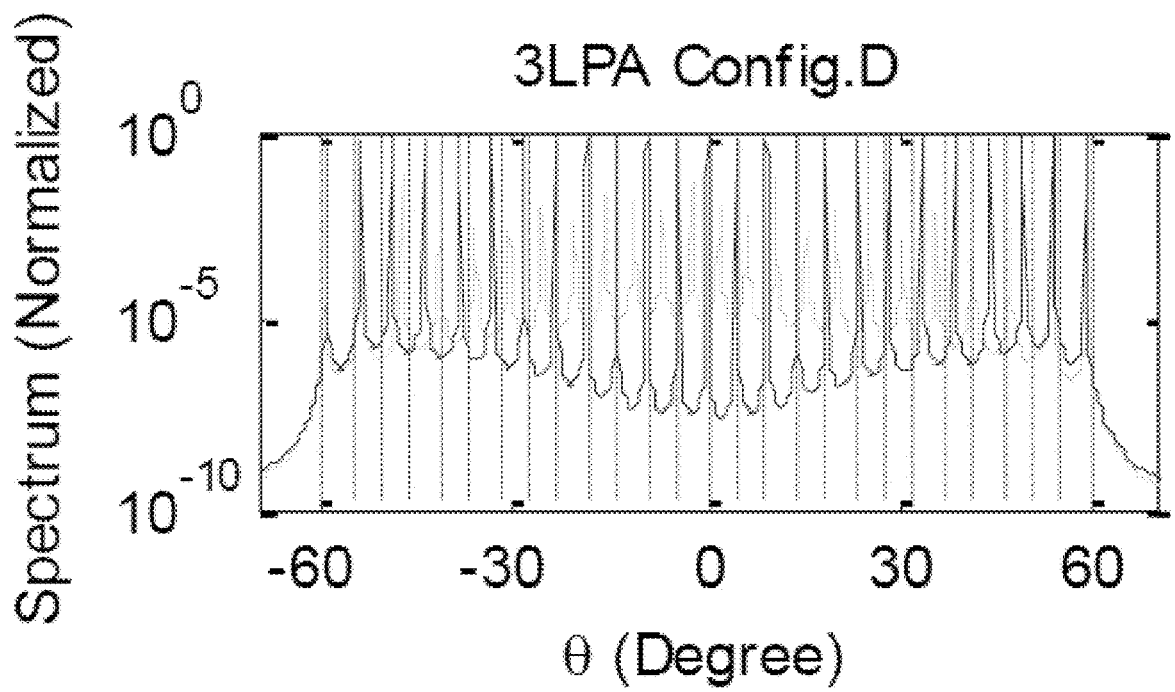
FIG. 4D illustrates estimated spatial spectra estimated for 3LPA configurations using MUSIC (dashed lines) and Lasso (solid lines) for 3LPA and 3LPAC configurations using N=12 and with K=27.
Figure 4E:
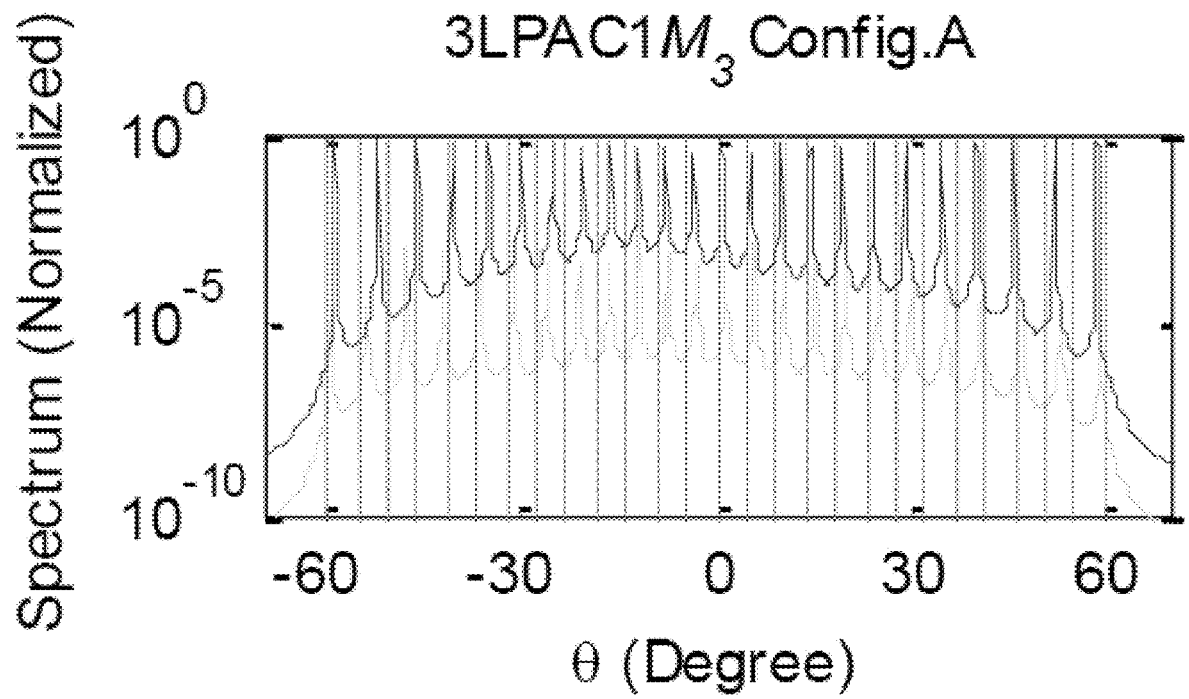
FIG. 4E illustrates estimated spatial spectra estimated for 3LPAC1M3 configurations using MUSIC (dashed lines) and Lasso (solid lines) for 3LPA and 3LPAC configurations using N=12 and with K=27.
Figure 4F:
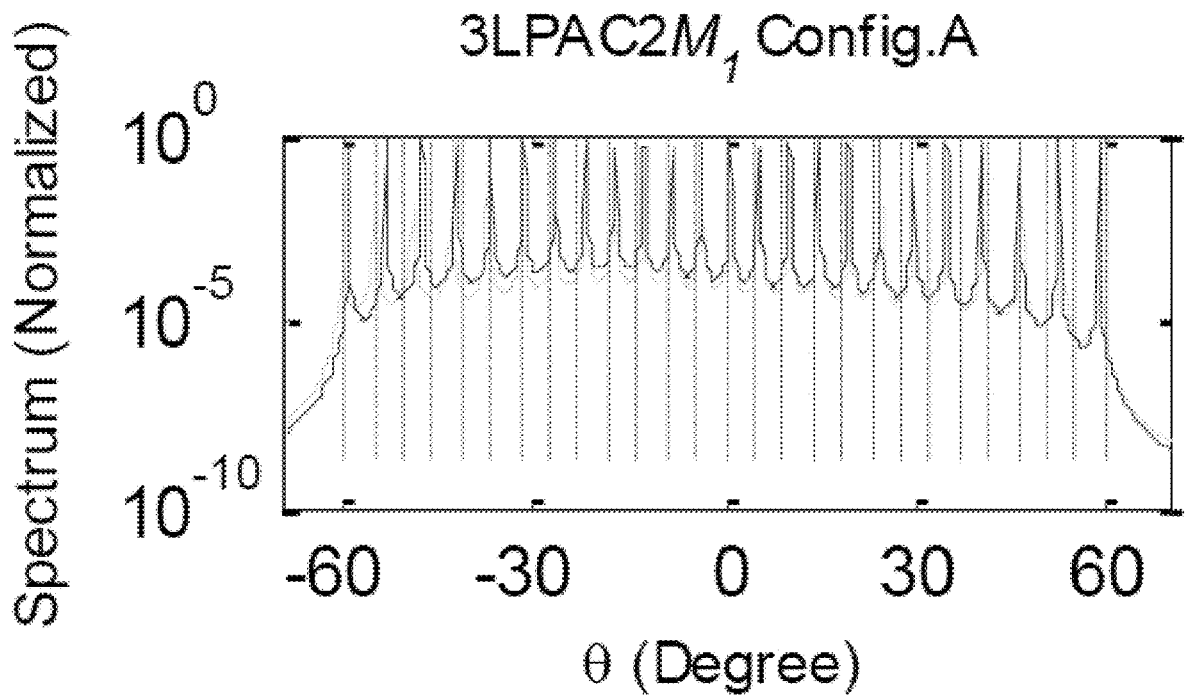
FIG. 4F illustrates estimated spatial spectra estimated for 3LPAC2M2 configurations using MUSIC (dashed lines) and Lasso (solid lines) for 3LPA and 3LPAC configurations using N=12 and with K=27.
Figure 4G:
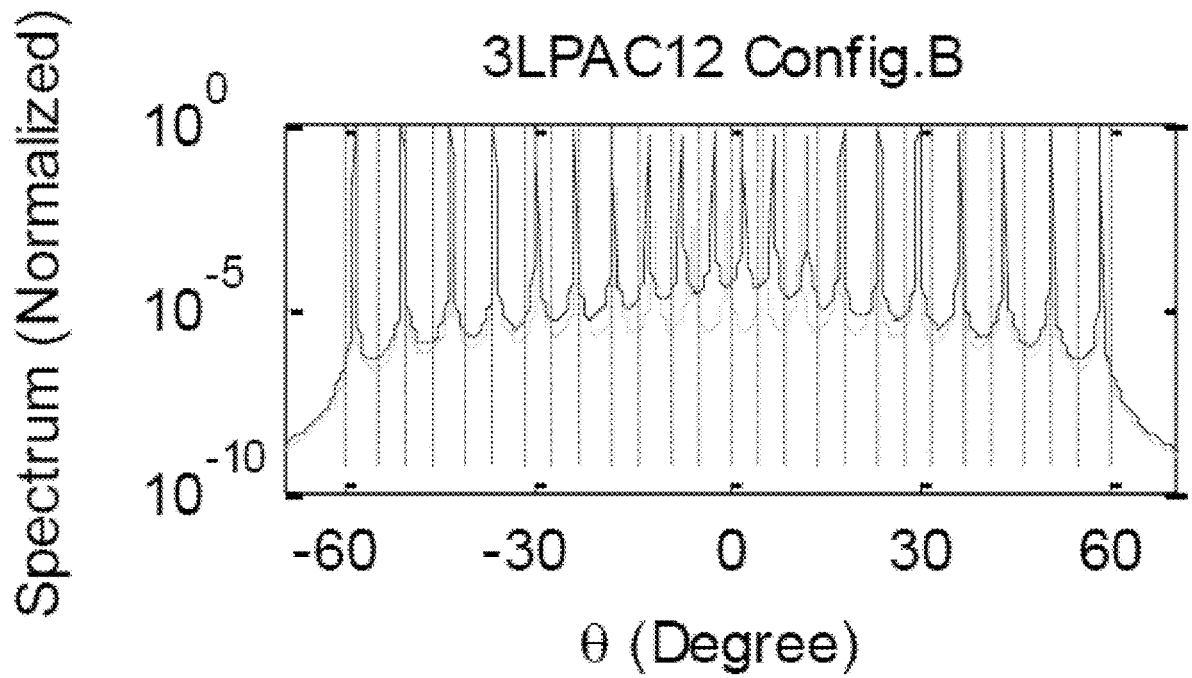
FIG. 4G illustrates estimated spatial spectra estimated for 3LPAC12 configurations using MUSIC (dashed lines) and Lasso (solid lines) for 3LPA and 3LPAC configurations using N=12 and with K=27.
Figure 4H:
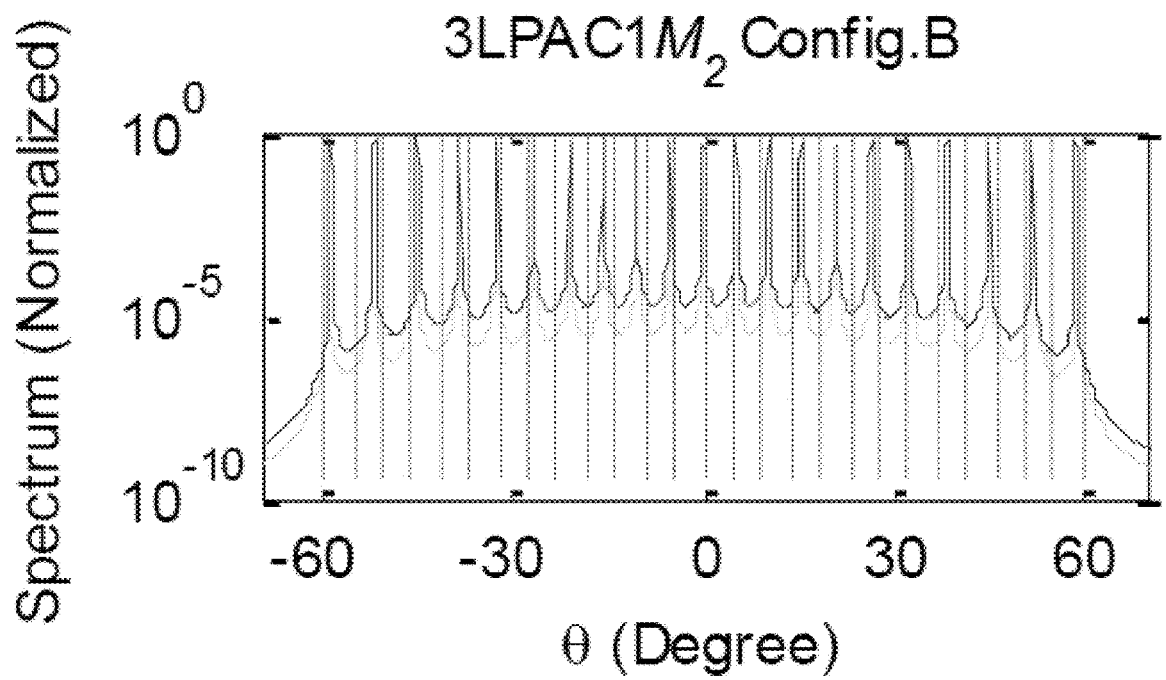
FIG. 4H illustrates estimated spatial spectra estimated for 3LPAC1M3 configurations using MUSIC (dashed lines) and Lasso (solid lines) for 3LPA and 3LPAC configurations using N=12 and with K=27.
Figure 4I:
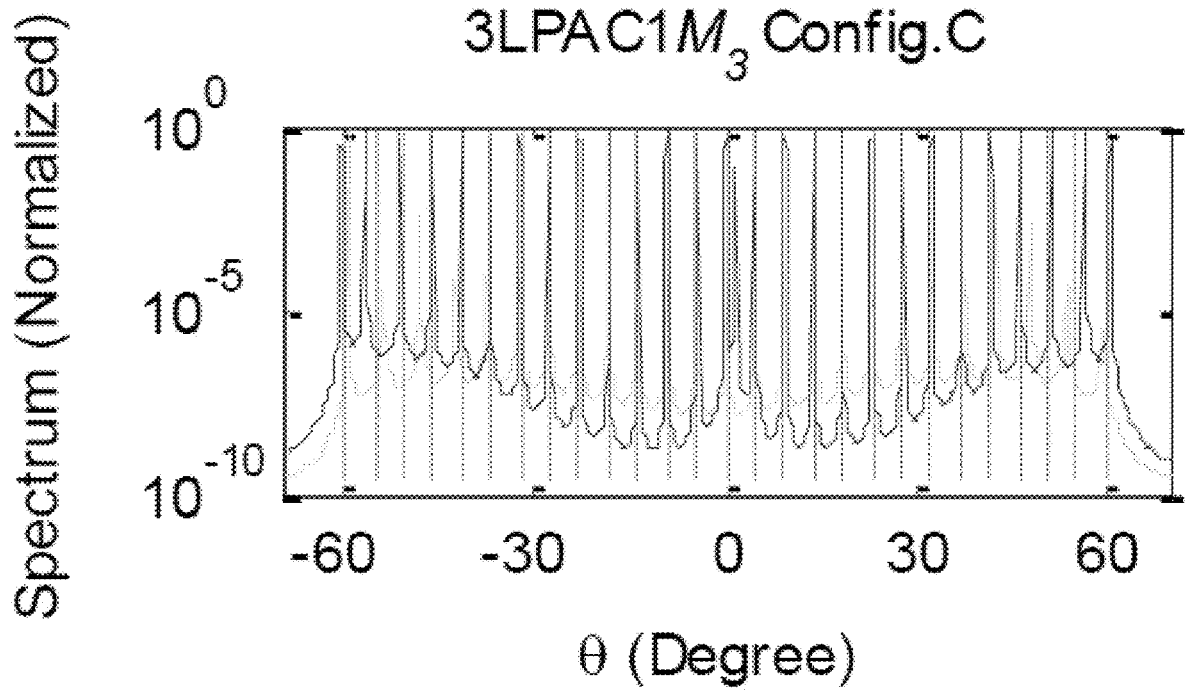
FIG. 4I illustrates estimated spatial spectra estimated for 3LPAC1M3 configurations using MUSIC (dashed lines) and Lasso (solid lines) for 3LPA and 3LPAC configurations using N=12 and with K=27.
Figure 4J:
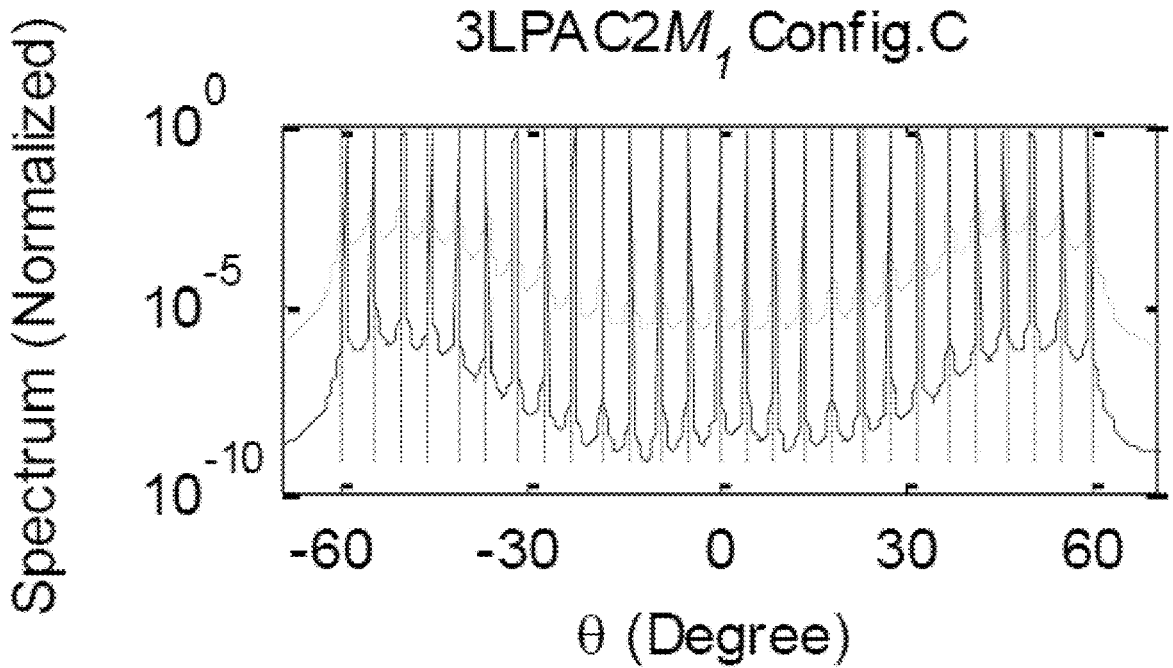
FIG. 4J illustrates estimated spatial spectra estimated for 3LPAC2M1 configurations using MUSIC (dashed lines) and Lasso (solid lines) for 3LPA and 3LPAC configurations using N=12 and with K=27.
Figure 4K:
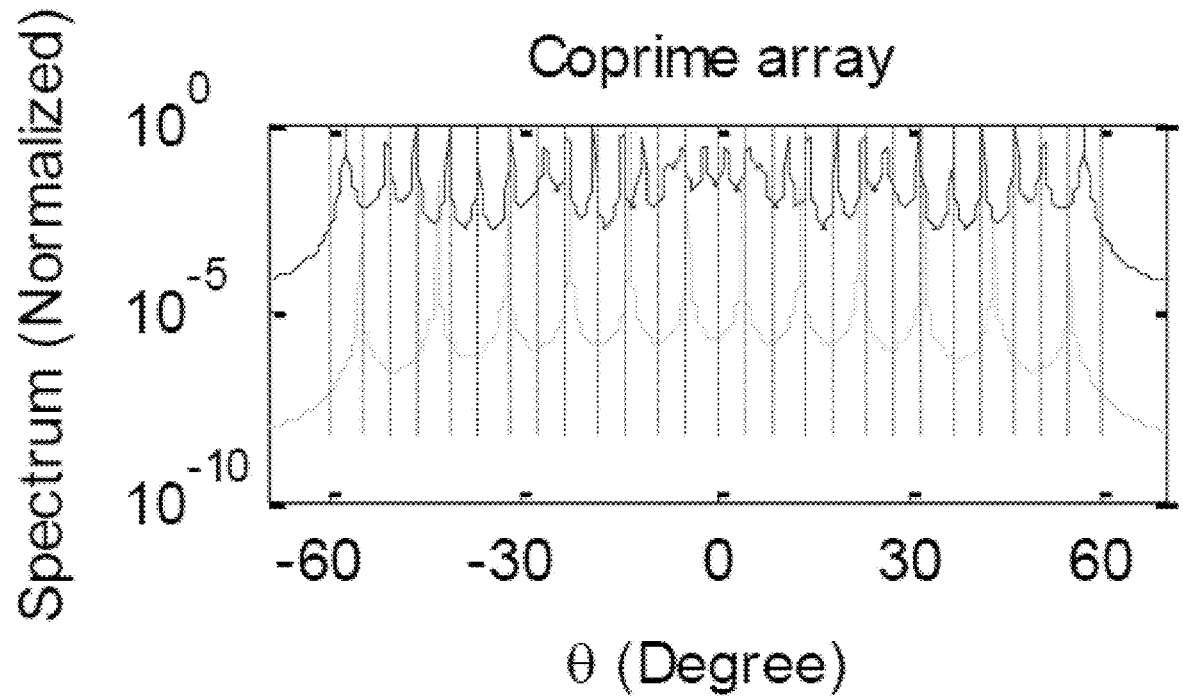
FIG. 4K illustrates estimated spatial spectra estimated for a coprime configuration using MUSIC (dashed lines) and Lasso (solid lines) for 3LPA and 3LPAC configurations using N=12 and with K=27.
Figure 4L:
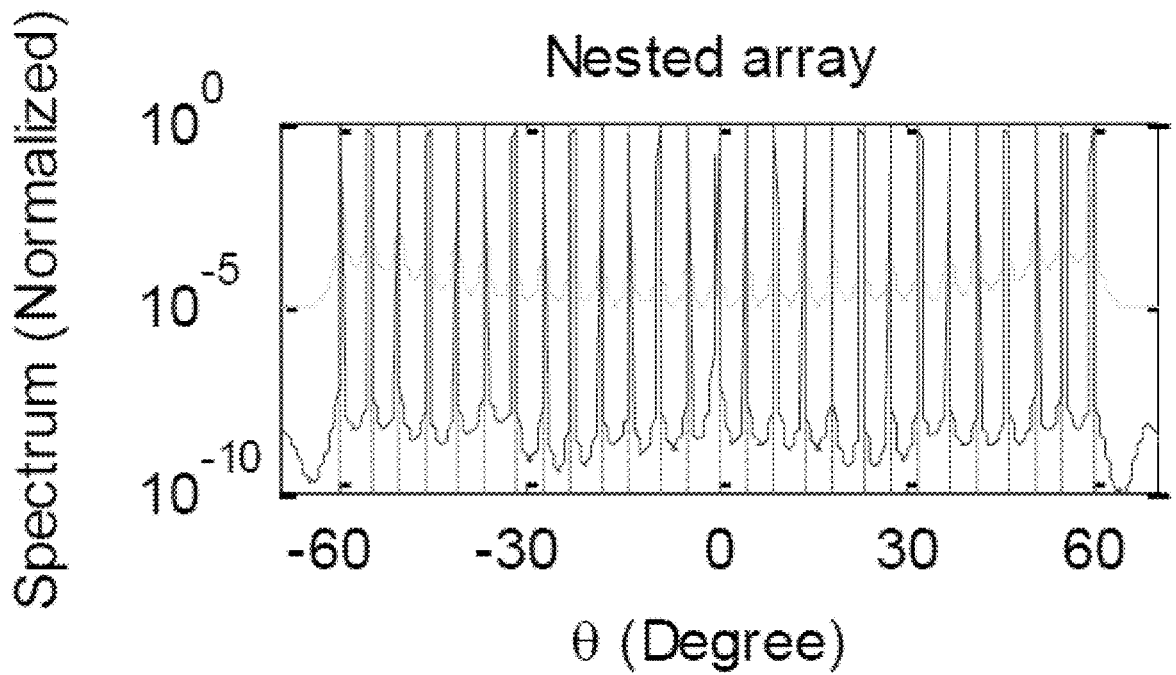
FIG. 4L illustrates estimated spatial spectra estimated for a nested array configuration using MUSIC (dashed lines) and Lasso (solid lines) for 3LPA and 3LPAC configurations using N=12 and with K=27.
Figure 5A:
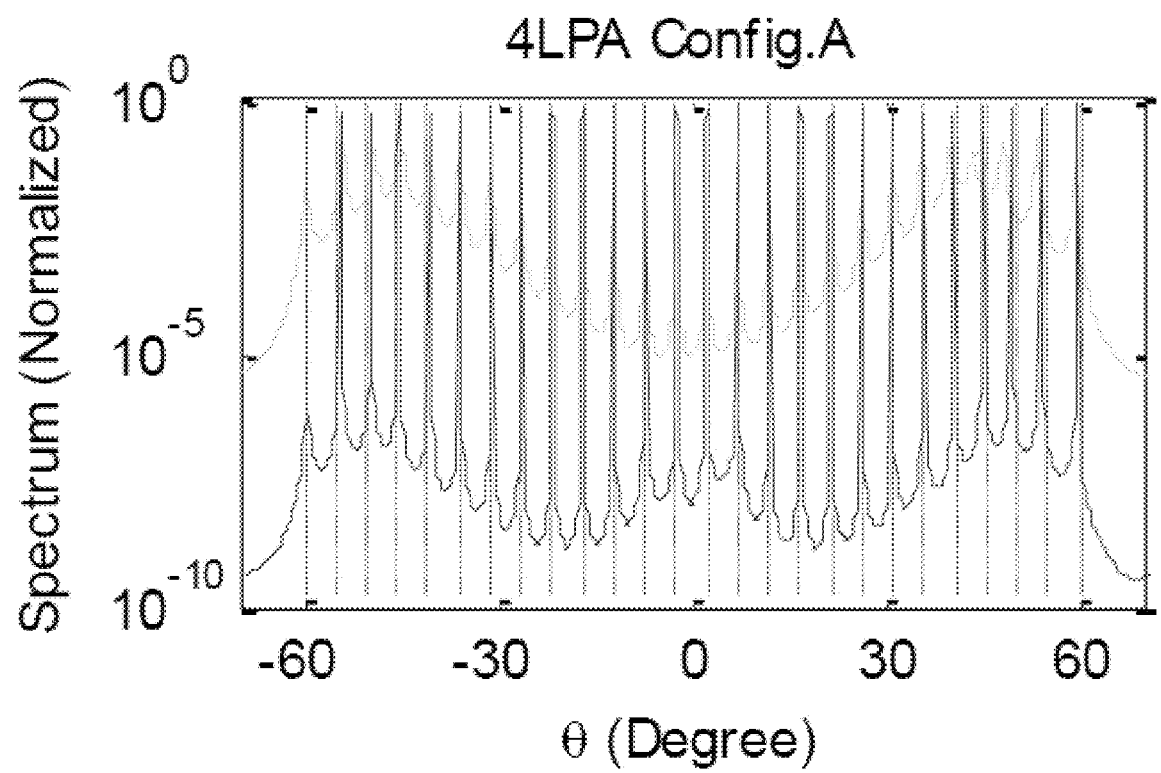
FIGS. 5A illustrates estimated spatial spectra for 4LPA configurations using MUSIC (dashed lines) and Lasso (solid lines) 4LPA and 4LPAC configurations using N=14 and with K=26.
Figure 5B:
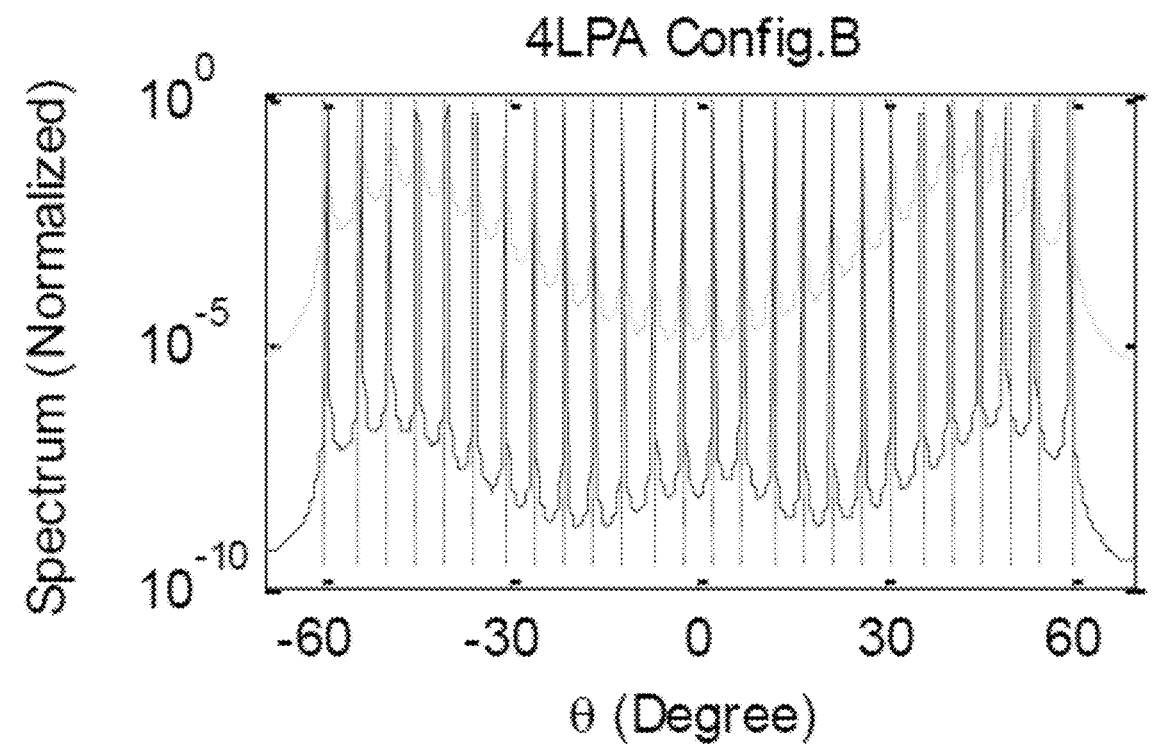
FIGS. 5B illustrates estimated spatial spectra for 4LPA configurations using MUSIC (dashed lines) and Lasso (solid lines) 4LPA and 4LPAC configurations using N=14 and with K=26.
Figure 5C:
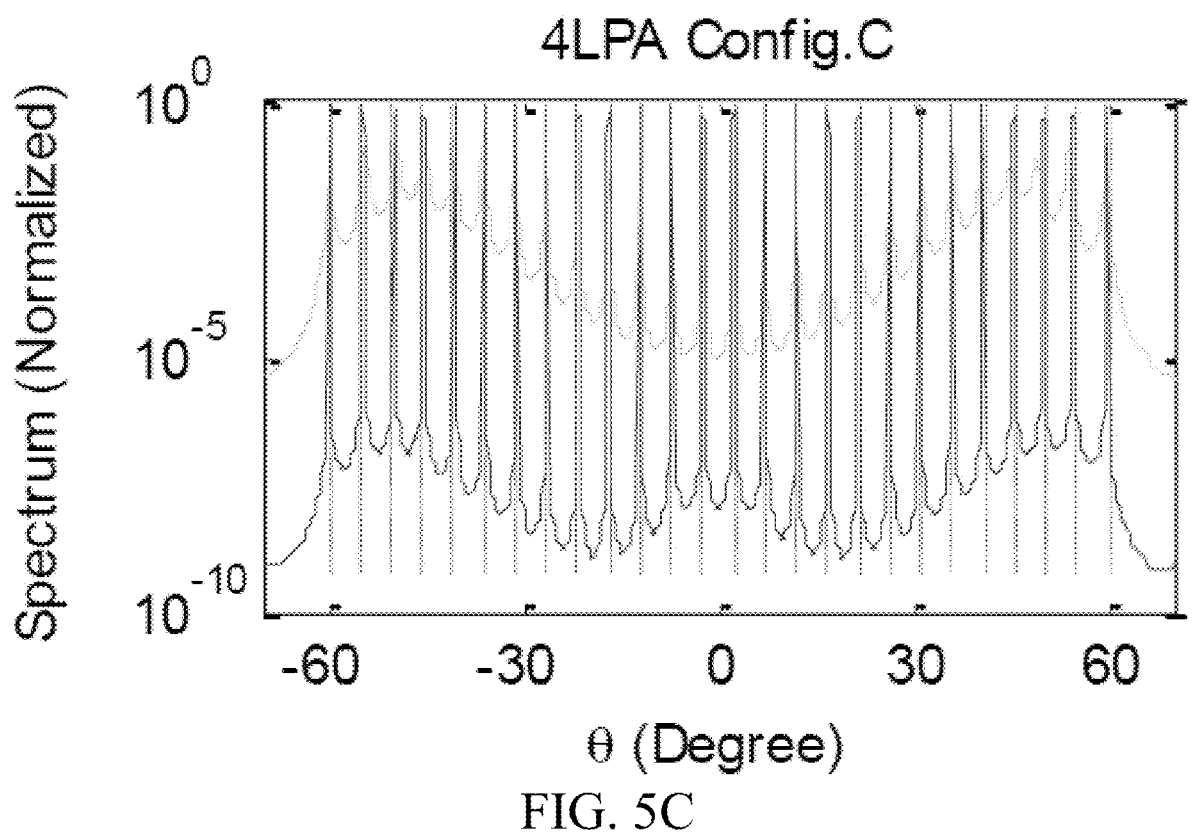
FIGS. 5C illustrates estimated spatial spectra for 4LPA configurations using MUSIC (dashed lines) and Lasso (solid lines) 4LPA and 4LPAC configurations using N=14 and with K=26.
Figure 5D:
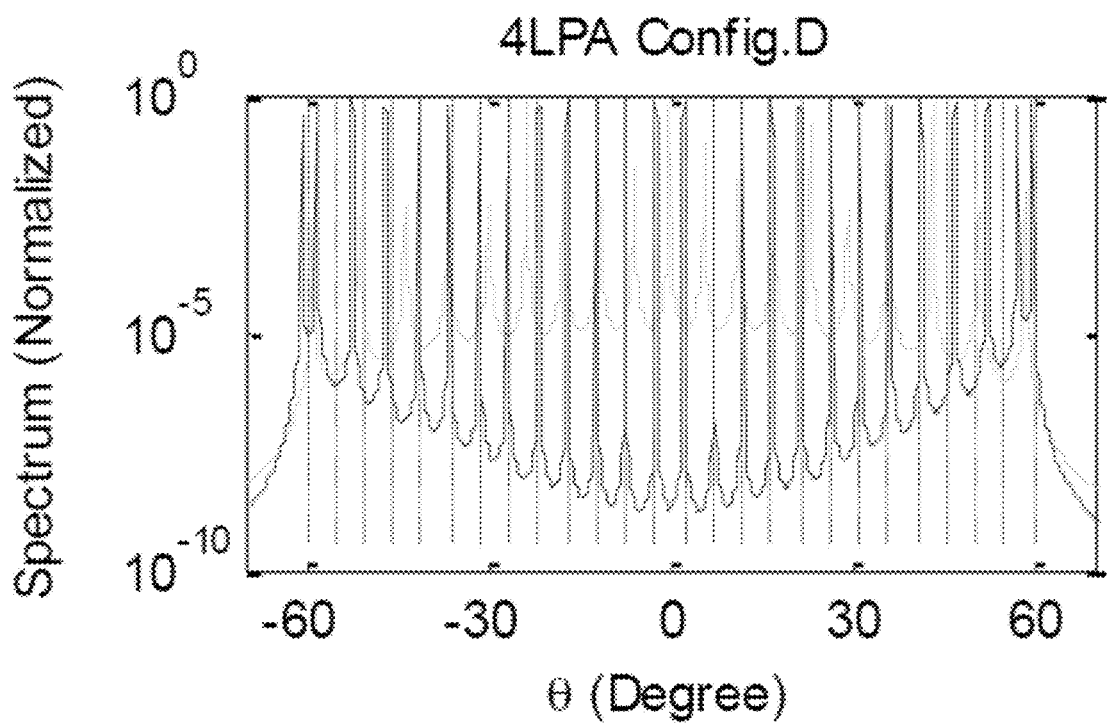
FIGS. 5D illustrates estimated spatial spectra for 4LPA configurations using MUSIC (dashed lines) and Lasso (solid lines) 4LPA and 4LPAC configurations using N=14 and with K=26.
Figure 5E:
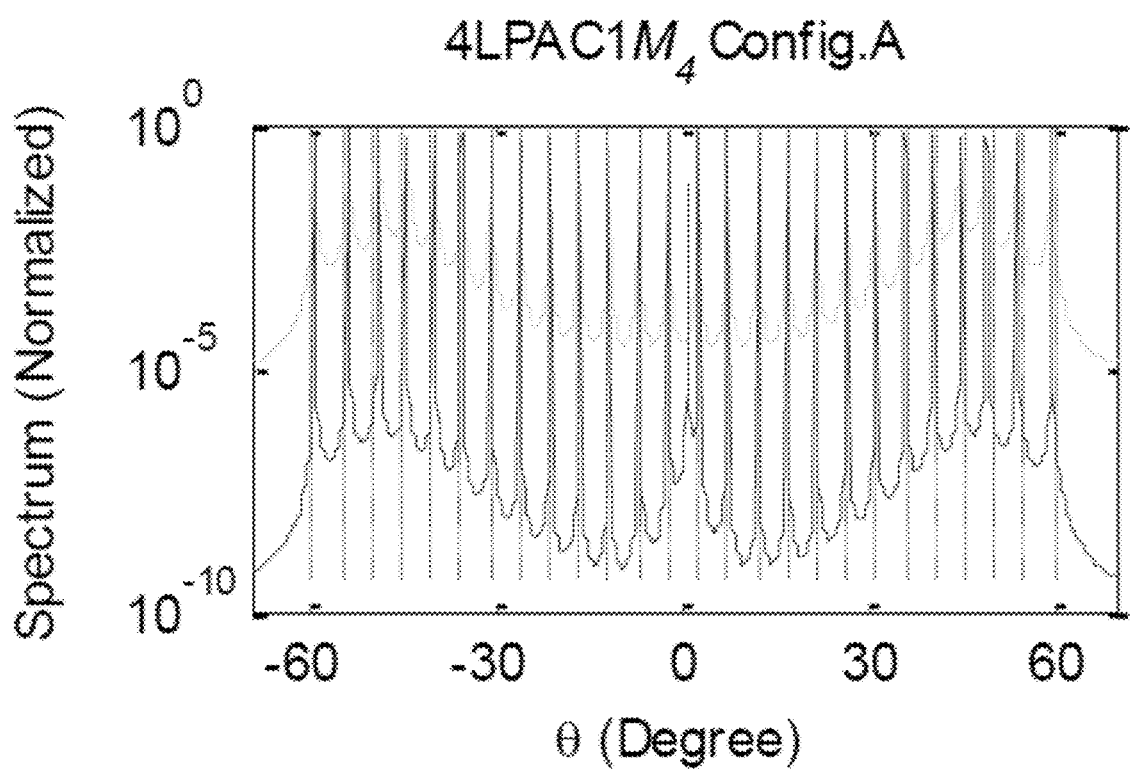
FIGS. 5E illustrates estimated spatial spectra for 4LPAC1M4 configurations using MUSIC (dashed lines) and Lasso (solid lines) 4LPA and 4LPAC configurations using N=14 and with K=26.
Figure 5F:
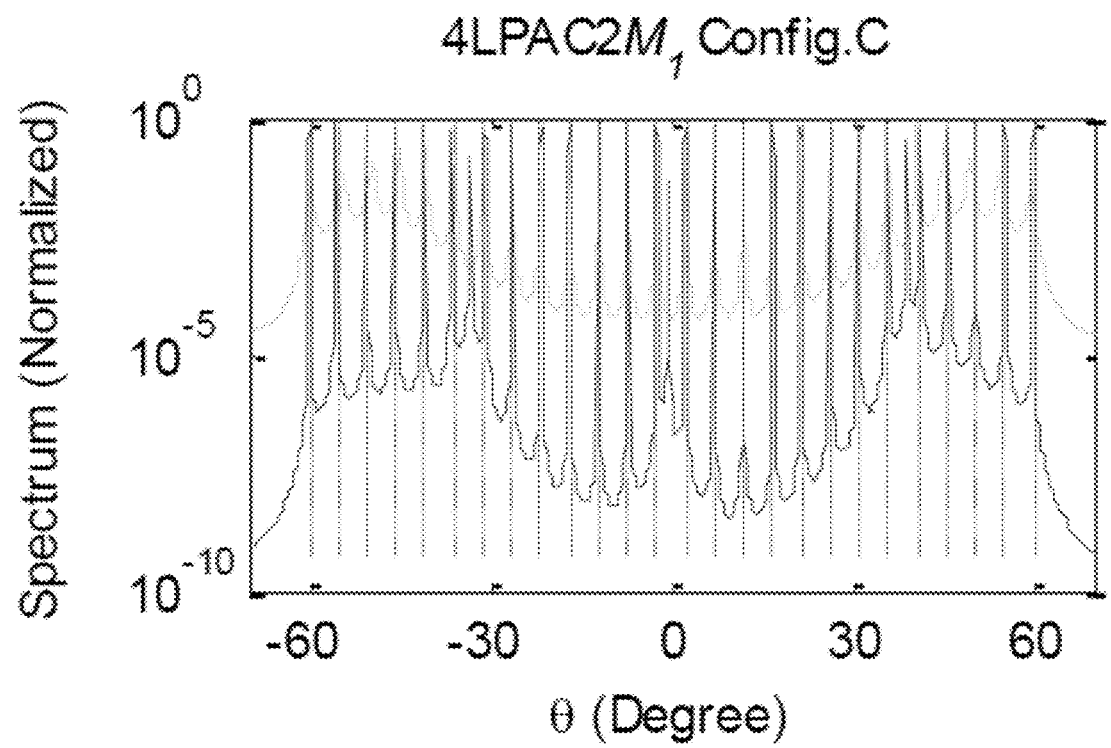
FIGS. 5F illustrates estimated spatial spectra for 4LPAC2M1 configurations using MUSIC (dashed lines) and Lasso (solid lines) 4LPA and 4LPAC configurations using N=14 and with K=26.
Figure 5G:
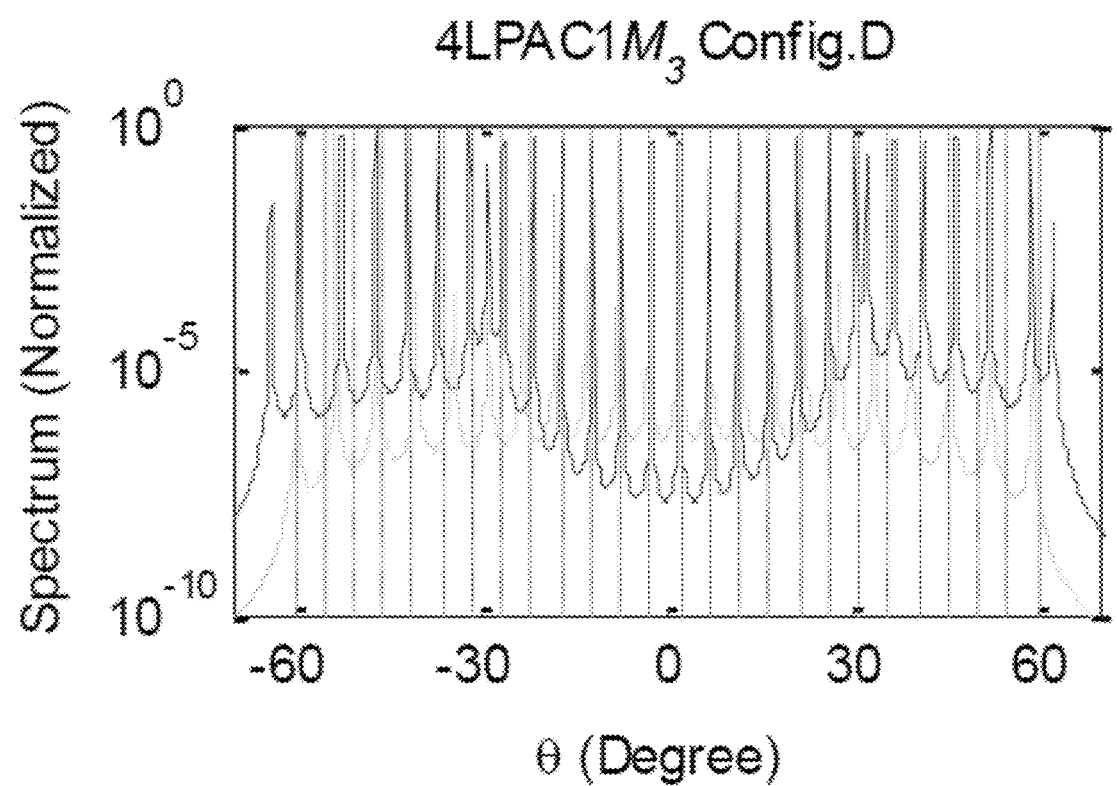
FIGS. 5G illustrates estimated spatial spectra for 4LPAC2M1 configurations using MUSIC (dashed lines) and Lasso (solid lines) 4LPA and 4LPAC configurations using N=14 and with K=26.
Figure 5H:
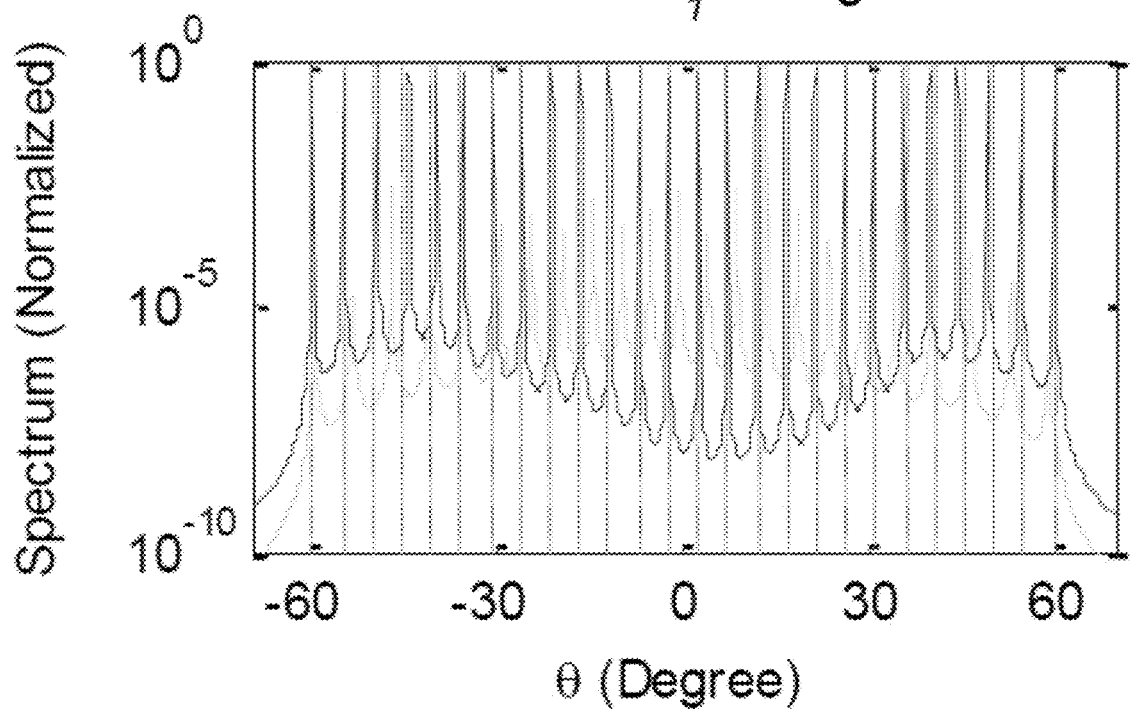
FIGS. 5H illustrates estimated spatial spectra for 4LPAC1M3 configurations using MUSIC (dashed lines) and Lasso (solid lines) 4LPA and 4LPAC configurations using N=14 and with K=26.
Figure 5I:
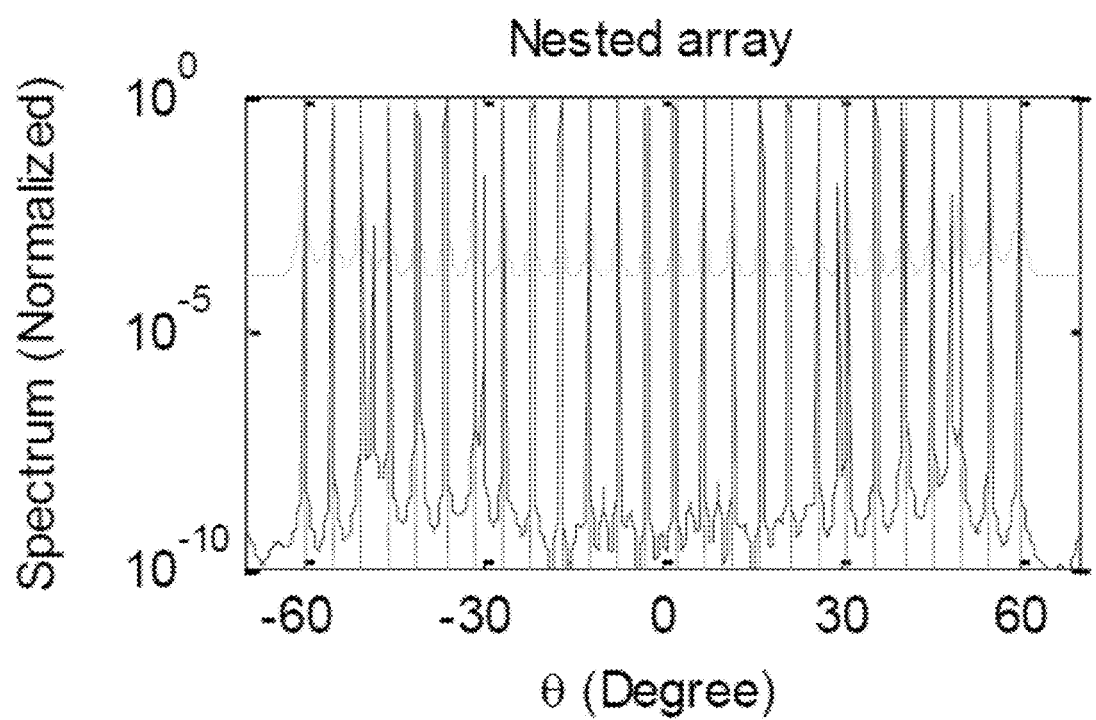
FIGS. 5I illustrates estimated spatial spectra for 4LPAC2M1 configurations using MUSIC (dashed lines) and Lasso (solid lines) 4LPA and 4LPAC configurations using N=14 and with K=26.

Therefore, the third subarray cannot be compressed while maintaining equal aperture size. There is a chance to compress the first and the third subarray if the configuration according to Equation (2) is to hold. If the first subarray is compressed, the ordered inter-element spacing becomes $\mathbb{S}_2=\{M_3/c, M_1, M_2\}d$ with c=3 or c=9. The corresponding arrays are referred to as 3LPAC13 and 3LPAC19, respectively. The arrays structure and the corresponding weight functions are illustrated in FIGS. 2C-F. The elements within the second subarray can be spaced by $M_1 d/2$ or d which makes the ordered inter-element spacing $\mathbb{S}_2=\{M_3, M_1/c, M_2\}d$ with c=2 and c=$M_1$. In this case, 3LPAC22 and 3LPAC24 can be constructed as depicted in FIGS. 2(d) and (e), respectively. Although the 3LPA has large number of consecutive lags, $l_c$, twelve missing lags appear in the corresponding weight function. Through compression, the weight function has been redistributed and some of the redundant lags have been moved to the missing lags, as shown in FIG. 2G-J. Therefore, the 3LPAC19 and 3LPAC24 achieve a hole free difference co-arrays where all lags are unique and consecutive. The price paid for this improvement is the reduction in the inter-element spacing of the compressed subarray.

For comparison purpose, the 3LPA, 3LPAC, 4LPA, and 4LPAC configurations are compared in terms of the aperture size, D, the number of unique lags $l_u$, and number of consecutive lags $l_c$. The conventional coprime arrays and nested arrays as known in the prior art that achieve the maximum DOF are also included.

A total of N=10 antenna elements are used to construct 3LPA and PA configurations. All 3LPA and PA configurations in Table 2 (see below) have larger numbers of consecutive lags and require smaller aperture sizes compared with the coprime array and nested array at the expense of reduced number of unique lags. The considered configurations have only two holes appear in the difference co-arrays. Some configurations realize hole free difference co-arrays after compression is applied.

In Table 3 as shown below, the number of antennas to N=12 elements is increased. As the aperture size of the 3LPA increases, the number of unique lags and the number of consecutive lags increase. A larger number of unique lags with smaller aperture size than that of coprime array can be achieved and the number of consecutive lags is almost doubled. There are some 3LPAC configurations that can achieve hole free difference co-arrays.

TABLE 2

Comparison between array's characteristics for N = 10

| Configuration | | m | Compressed Subarray | c | S | D | $l_u$ | $l_c$ |
|---|---|---|---|---|---|---|---|---|
| Nested array | | as in [5] | NA | | as in [5] | 29d | 59 | 59 |
| Coprime array | | m = [5, 6] | NA | | {6, 5}d | 25d | 39 | 21 |
| 3LPA | Config. A | $m_1$ = | NA | | {7, 2, 3}d | 18d | 35 | 33 |
| 3LPAC | | [2, 3, 7] | 1 | $M_3$ | {1, 2, 3}d | | 37 | 37 |
| | | | 2 | $M_1$ | {7, 1, 3}d | | | |
| 3LPA | Config. B | | NA | | {3, 7, 2}d | 14d | 27 | 25 |
| 3LPAC | | | 1 | $M_1$ | {1, 7, 2}d | | 29 | 29 |
| PA | Config. A | $m_2$ = | NA | | {5, 3, 4}d | 16d | 29 | 27 |
| PAC | | [3, 4, 5] | 1 | $M_3$ | {1, 3, 4}d | | 33 | 33 |
| | | | 2 | $M_1$ | {5, 1, 4}d | | | |
| PA | Config. B | | NA | | {4, 5, 3}d | 15d | 27 | 25 |
| PAC | | | 1 | 2 | {2, 5, 3}d | | 29 | 27 |
| | | | 1 | $M_2$ | {1, 5, 3}d | | 31 | 31 |

TABLE 3

3LPA characteristics for N = 12

| Configuration | | m | Compressed Subarray | c | S | D | $l_u$ | $l_c$ |
|---|---|---|---|---|---|---|---|---|
| Nested array | | as in [5] | NA | | as in [5] | 41d | 83 | 38 |
| Coprime array | | m = [6, 7] | NA | | {7, 6}d | 36d | 53 | 25 |
| 3LPA | Config. A | $m_1$ = | NA | | {7, 3, 4}d | 24d | 43 | 37 |
| 3LPAC | | [3, 4, 7] | 1 | $M_3$ | {1, 3, 4}d | | 49 | 49 |
| | | | 2 | $M_1$ | {7, 1, 4}d | | | |
| 3LPA | Config. B | | NA | | {4, 7, 3}d | 21d | 37 | 31 |
| 3LPAC | | | 1 | 2 | {2, 7, 3}d | | 41 | 39 |
| | | | 1 | $M_2$ | {1, 7, 3}d | | 43 | 43 |
| 3LPA | Config. C | $m_2$ = | NA | | {7, 2, 5}d | 30d | 57 | 53 |
| 3LPAC | | [2, 5, 7] | 1 | $M_3$ | {1, 2, 5}d | | 59 | 53 |
| | | | 2 | $M_1$ | {7, 1, 5}d | | 61 | 61 |
| 3LPA | Config. D | | NA | | {5, 7, 2}d | 28d | 53 | 49 |

TABLE 4

4LPA characteristics for N = 14

| Configuration | | m | Compressed Subarray | c | S | D | $l_u$ | $l_c$ |
|---|---|---|---|---|---|---|---|---|
| Nested array | | as in [5] | NA | | as is [5] | 71d | 143 | 143 |
| Coprime array | | m = [7, 8] | NA | | {8, 7}d | 49d | 69 | 29 |
| 4LPA | Config. A | m = | NA | | {7, 2, 3, 5}d | 30d | 59 | 57 |
| 4LPAC | | [2, 3, 5, 7] | 1 | $M_4$ | {1, 2, 3, 5}d | | 61 | 61 |
| 4LPA | Config. B | | NA | | {3, 7, 2, 5}d | | 59 | 57 |
| 4LPA | Config. C | | NA | | {3, 2, 7, 5}d | | 59 | 57 |
| 4LPAC | | | 2 | $M_1$ | {3, 1, 7, 5}d | | 61 | 61 |
| 4LPA | | | NA | | {5, 2, 7, 3}d | 28d | 53 | 39 |
| 4LPAC | Config. D | | 1 | $M_3$ | {1, 2, 7, 3}d | | 55 | 45 |
| | | | 2 | $M_1$ | {5, 1, 7, 3}d | | 55 | 47 |

With N=14, four 4LPA configurations can be constructed by selecting the ordered inter-element spacing as shown in Table 4. Although three 4LPA configurations have different inter-element spacing and antenna locations, they result in equivalent difference co-arrays where D=30d, $l_u$=59, and $l_c$=57. Few holes appear in the difference co-array which can be removed through compression. The number of consecutive lags can be improved using different compression factors. As a result, 4LPAC configurations with hole free difference co-arrays are realized. Note that, the number of unique lags in all considered cases of Table 2, Table 3, and Table 4 are increased as well.

There are different DOA estimation algorithms known in the art, among which is the MUSIC algorithm which excels in performance if the sources to be estimated are uncorrelated. Prior processing, like spatial smoothing, can be applied to reduce the effect of the correlation to resort the rank of the autocorrelation matrix of the received data. Sparse reconstruction via the compressive sensing (CS) algorithm can be also applied for DOA estimation since the problem in hand is sparse in the spatial domain. The two algorithms realize different DOFs because sparse reconstruction's algorithms can exploit all unique lags whereas the MUSIC algorithm can exploit half of the number of consecutive lags in the difference co-array. In the following, two DOA estimation approaches namely MUSIC algorithm and CS are reformulated in the context of MLPA.

MUSIC Algorithm With Spatial Smoothing

To perform DOA estimation, the difference co-array is used in order to increase the number of estimated sources. Therefore, virtual antenna locations are used instead of the physical locations. Based on the presented DOA model, vectorizing the covariance matrix of the received signal yields a vector x that amounts to the received data coming from an extended co-array aperture as in:

$$x = \text{vec}(R_{YY}) = \tilde{A}b + \sigma_n^2 \tilde{I} = Br \quad (15)$$

where $\tilde{A} = [\tilde{a}(\theta_1), \tilde{a}(\theta_2), \ldots, \tilde{a}(\theta_K)]$ is the steering matrix of size $N^2 \times K$, $\tilde{a}(\theta_k) = a^*(\theta_k) \otimes a(\theta_k)$ with $\otimes$ denotes the Kronecker product, $b = [\sigma_1^2, \sigma_2^2, \ldots, \sigma_K^2]^T$, $\tilde{I} = \text{vec}(I_N)$, $B = [\tilde{A}, \tilde{I}]$ and $r = [b^T, \sigma_n^2]^T$. The operator (*) denotes the complex conjugate without transpose. Since the virtual source signal model is a single snapshot of b, the rank of the noise free autocorrelation function $R_{xx}$ is one. In this case, the sources become fully correlated. Consequently, subspace based DOA estimation such as through the MUSIC algorithm cannot be used directly. To handle this, prior spatial smoothing can be performed. Spatial smoothing can be exploited using an array configuration that has consecutive lags. Since the MLPA can achieve a large number of consecutive lags, the MUSIC algorithm is applicable for DOA estimation in this situation.

To apply spatial smoothing, the consecutive lags are extracted from x and arranged in a new vector $x_1$ where the redundant lags within the consecutive lags are averaged. The resultant virtual array, $x_1$, is then divided into several overlapped subarrays. Finally, the autocorrelation matrices of all overlapped subarrays are averaged to get a full-rank matrix. Since the MLPA has a symmetric difference co-array around the origin, the number of consecutive lags is an odd number. If $[-l_x, l_x]$ is a set of consecutive lags in the difference co-array, where $l_x = (l_c 1)/2$, then the following applies:

$$x_1 = \tilde{A}_1 b + \sigma_n^2 \tilde{I}_1 \quad (16)$$

where $\tilde{A}_1$ is a steering matrix of size $l_c \times K$ like that of a ULA with $l_c$ antenna elements located at $\{-l_x d : l_x d\}$ and $\tilde{I}_1$ is a vector of length $l_c \times 1$ with "1" at the $(l_x+1)^{th}$ location and the remaining entries are zeros. This new virtual array is then divided into $l_x+1$ subarrays, $x_{1i}$, $i=1,2,\ldots,l_x+1$. The subarrays are overlap and have elements at positions $(-i+1+k)d$ for $k=0,1,\ldots,l_x$. Each subarray, $x_{1i}$, has autocorrelation matrix $R_{x_{1i}x_{1i}} = x_{1i}x_{1i}^H$. By considering all subarrays, the averages autocorrelation matrix which has a full-rank is given as follows:

$$R_{xx}^{SS} = \frac{1}{l_x+1} \sum_{i=1}^{l_x+1} R_{x_{1i}x_{1i}} \quad (17)$$

Therefore, the MUSIC algorithm can be implemented directly on the spatially smoothed matrix $R_{xx}^{ss}$ and $l_x$ DOF can be realized. The eigenvectors that span the space of $R_{xx}^{ss}$ can be divided into signal subspace, $E_s$, and noise subspace, $E_n$, which are orthogonal. The signal subspace is spanned by eigenvectors that corresponds to the K largest eigenvalues while the noise subspace is spanned by the eigenvectors that correspond to the $l_c$-K smallest eigenvalues of $R_{xx}^{ss}$. Eigenvalue decomposition on $R_{xx}^{ss}$ can be performed as follows:

$$R_{XX}^{SS} = [E_S \ E_n] \sum \begin{bmatrix} E_n^H \\ E_S^H \end{bmatrix} \quad (18)$$

where $\Sigma$ is a diagonal matrix that contains the eigenvalues in descending order. Since the steering vectors of the sources span the signal subspace, this makes them orthogonal to the noise subspace as well, i.e. $a^H(\theta)E_n E_n^H a(\theta) = 0$. Therefore, the estimated spectrum of the MUSIC algorithm can be expressed as:

$$P_{MUSIC}(\theta) = \frac{1}{a^H(\theta)E_n E_n^H a(\theta)} \quad (19)$$

where $\theta$ is an arbitrary scanning angle. The K largest peaks of $P_{MUSIC}(\theta)$ correspond to estimated DOAs of the unknown sources.

The problem in Equation (15) can be solved as:

$$\hat{r} = \min_r \|r\|_0 \text{ subject to } \|x - Br\|_2 < \epsilon \quad (20)$$

where $\in$ is a user specific bound. Sparse signal recovery using Lasso can be used to solve such problems based on the $l_1$-norm instead of $l_0$-nrom. Let $B^g$ be a new steering matrix constructed using the steering vectors of all possible angles with grid search taken as: $\theta_1^g, \theta_2^g, \ldots, \theta_{N_\theta}^g$, where $N_\theta$ represents the total number of grid search angles. The Lasso objective function for complex data can be expressed as [13]:

$$\hat{r}^g = \min_{r^g} \left[ \frac{1}{2} \|\tilde{x} - \tilde{B}^g r^g\|_2 + \lambda_t \|r^g\|_1 \right] \quad (21)$$

where $\lambda_t$ is a regularization parameter, $\tilde{B}^g = [\text{real}(B^g)^T, \text{imag}(B^g)^T]^T$ and $\tilde{x} = [\text{real}(x)^T, \text{imag}(x)^T]^T$. The last entry in the sparse estimated vector, $\hat{r}^g$, represents the estimated noise variance. The positions of the remaining non-zero entries represent the estimated DOAs and their values indicate the corresponding signal power.

The achievable DOF using the generalized MLPA and MLPAC is illustrated with numerical examples. The performance of the proposed configurations is further evaluated based on Monte Carol simulations.

For MUSIC and CS Spectra, the results are examined in terms of the maximum number of sources that can be estimated using MLPA and MLPAC configurations. Narrowband and uncorrelated sources located in the far-field are assumed. The sources are assumed to be uniformly distributed between $-60°$ and $60°$ and their number is greater than the number of antenna elements, $K > N$. A total of $L = 2000$ noise-free samples are used to determine the achievable DOF. The DOAs are estimated using Lasso and MUSIC techniques. For comparison purposes, the grid search is uniform with a step equals $\theta_i^g = 0.25°$ within $[-90°, 90°]$. Furthermore, the regularization parameter is $\lambda_t = 0.85$ and the minimum inter-element spacing is adjusted to be $d = \lambda/2$. All these parameters are fixed unless stated otherwise. In all figures, the estimated spatial spectra are plotted versus the DOA in degrees where the actual DOAs are indicated by dotted red lines. Only angles between [−70°, 70°] are shown in order to have readable figures but no significant values appear outside this range in the considered cases.

For DOF of 3LPA FIG. 3A-I shows the spatial spectra estimated using the MUSIC and Lasso algorithms for the 3LPA, 3LPAC, PA and PAC configurations using N=10 elements when K=16 sources. There are two configurations for each of 3LPA and PA as shown in Table 2 in addition to the compressed versions. The last two configurations (PAC Config.B) are not considered in the simulation. For the MUSIC algorithm, only half the number of consecutive lags can be exploited. Based on Table 2, configurations with larger DOF than 16 can estimate all sources as FIG. 3A-I depict. A nested array has the largest DOF and the proposed configurations have 11 lags less. In the case of the CS algorithm, a higher DOF can be realized because all unique lags are utilized. Some configurations can resolve all the 16 sources correctly in addition to the coprime array and nested arrays (not shown). Though, others cannot resolve all sources due to their small DOFs as shown in FIG. 3A-I. The configurations require smaller aperture size and achieve larger $l_c$ compared with coprime array. The Lasso algorithm attains significant spectrum at the estimated angles with very low side lobes which is not the case of the MUSIC algorithm.

As the number of antenna elements increases, larger DOF is expected. Assuming that K=27 sources impinge on the 3LPA and 3LPAC configurations presented in Table 3. Only one configuration has enough DOF to resolve all 27 sources when MUSIC algorithm is used as FIGS. 4A-L demonstrates. On the other hand, more configurations can detect all sources using Lasso algorithm due to the higher DOFs achieved by exploiting all unique lags as depicted in FIGS. 4A-L. Although nested array and 3LPAC have hole free difference co-arrays, nested array has 22 lags more than the proposed 3LPAC but it requires larger aperture size of 11d as illustrated in Table 3. It is evident that Lasso algorithm provides large values at the estimated angles.

For DOF of 4LPA a total of K=26 sources is assumed to be estimated with N=14 antennas using the 4LPA and 4LPAC configurations in Table 4. FIG. 5 shows the estimated spectra using the MUSIC and Lasso algorithms. The results confirm that all configurations can resolve all sources except those with lower DOF when the MUSIC algorithm is used. FIG. 5 also demonstrates that almost similar spectra are realized based on the configurations that have equal number of lags. Due to lack of lags, some configurations cannot detect all sources correctly. Moreover, when certain configurations cannot resolve some sources, those sources are the ones close to −60 and 60 degrees. Sources at zero degrees or close to that are detected with large probability since they are located within the broadside of the arrays.

Further investigation is conducted for root mean square to verify the effectiveness of the proposed configurations through the Monte Carol simulations. The average root mean square error (RMSE) of the estimated DOAs is defined as:

$$RMSE = \sqrt{\frac{\sum_{j=1}^{I_{iter}}\sum_{i=1}^{K}(\theta_i - \hat{\theta}_i(j))^2}{I_{iter}K}} \quad (22)$$

where $\hat{\theta}_i(j)$ is the estimate DOA of $\theta_i$ at the $j^{th}$ Monte Carlo trial, j=1,2, . . . ,$I_{iter}$. Uncorrelated narrowband sources located in the far field are assumed. The RMSE is evaluated as a function of the SNR and the number of samples, L. Apart from the coprime array, the number of sources is lower than the DOF for all configurations with the MUSIC and CS algorithms in all considered scenarios. Curves with similar markers are used for configurations with the same level, $N_p$, and the dashed, dotted curves are used for the corresponding compressed versions. While those with no markers are used for configuration presented for benchmarking purposes.

Both MUSIC and CS techniques are search based DOA algorithms. Therefore, the K largest values in the estimated spectrum represent the estimated DOAs. If the number of sources is known, a threshold can be applied to find the largest K values and then the corresponding DOAs. However, large and very close values at a candidate DOA can cancel some desired angles that have small values. This happens when the algorithm has low resolution which results in a wide beamwidth at the estimated DOAs. As a result, the accuracy of the estimation is degraded if the threshold is relied on. For this reason, a grid refinement can be utilized to overcome this problem.

After the normalized estimated spectrum is obtained, a window of an odd number of samples, δ, is used to refine the grid around each candidate DOA which correspond to $(\delta-1)\times\theta_i^g$ degree. First, the largest value in the estimated spectrum is selected and then force $(\delta-1)$ samples around it to zeros and form a new estimated spectrum. So there can be only one estimated angle within a total of δ samples centered at the largest value. After that, the second largest value is chosen in the new estimated spectrum and a total of $(\delta-1)$ samples around this selected value are forced to zeros. The process is repeated until all K largest values are covered. The grid refinement makes the estimated spectrum less noisy and sparser. According to our assumption, any two adjacent sources are separated by:

$$\Delta_\theta = \frac{120}{K-1} \quad (23)$$

The two adjacent sources are spaced by $\lfloor\Delta_\theta/\theta_i^g\rfloor$ samples where we take the floor to get an integer number. The problem of off-grid sources might appear which depends on the search grid, the number of sources, and their DOAs. A stable results can be acquired when δ=3 or δ=5 samples which corresponds to $(\delta-1)\times\theta_i^g=0.5°$ or $(\delta-1)\times\theta_i^g=1°$ respectively.

For RMSE versus SNR, due to the speed of the algorithms, a total of $I_{iter}$=5000 and $I_{iter}$=3000 independent trials are used using the MUSIC and Lasso algorithms, respectively. Array configurations, including those presented in Table 2, Table 3, and Table 4, are compared with respect to the SNR. The grid refinement is δ=3 samples and the number samples is L=1000 samples.

Figure 6A:
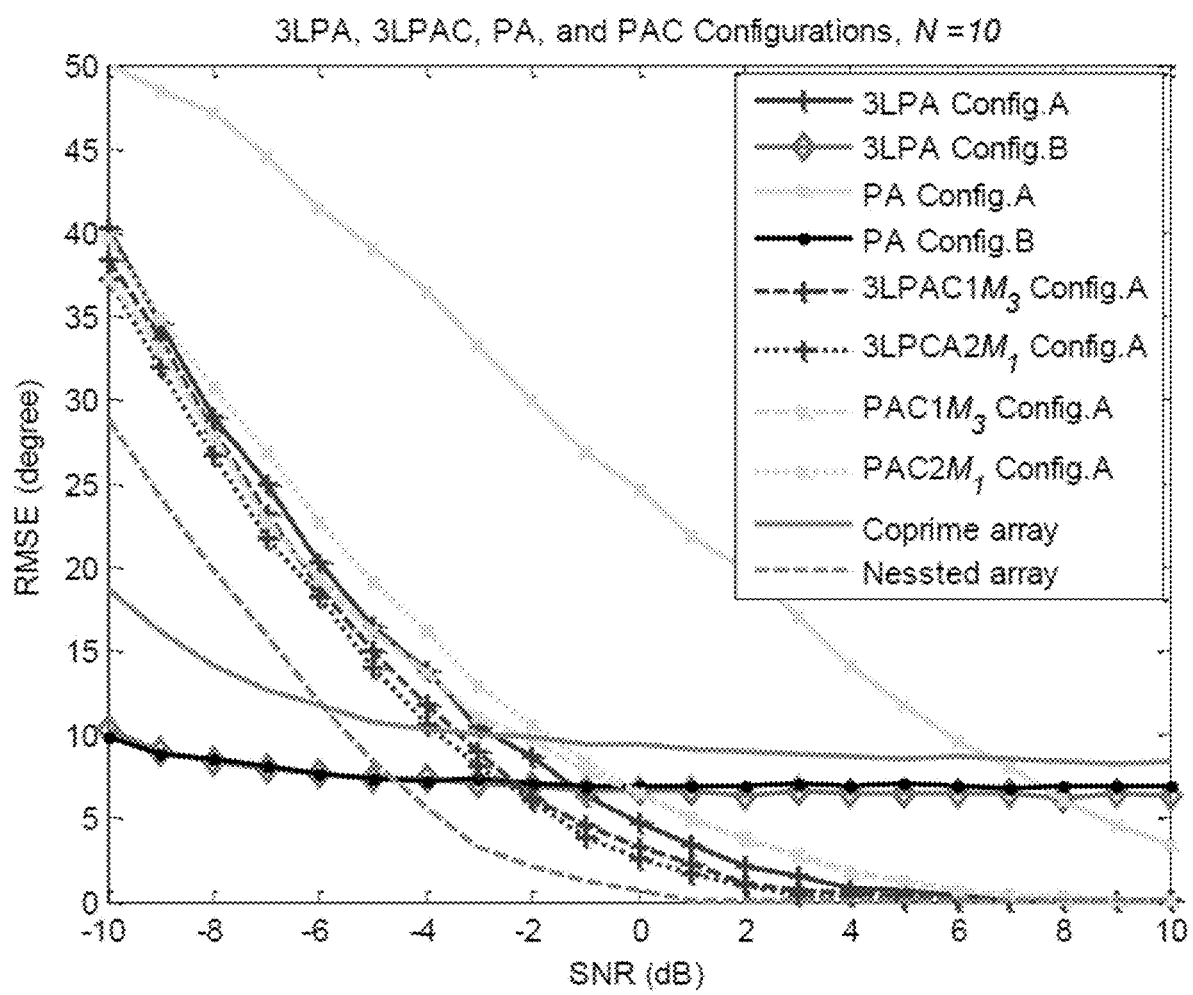
FIGS. 6A illustrates RMSE as a function of the SNR using MUSIC with K=12 sources, L=1000 samples, and N=10 SNR for 3LPA, PA, 3LPAC, and PAC configurations.
Figure 6B:
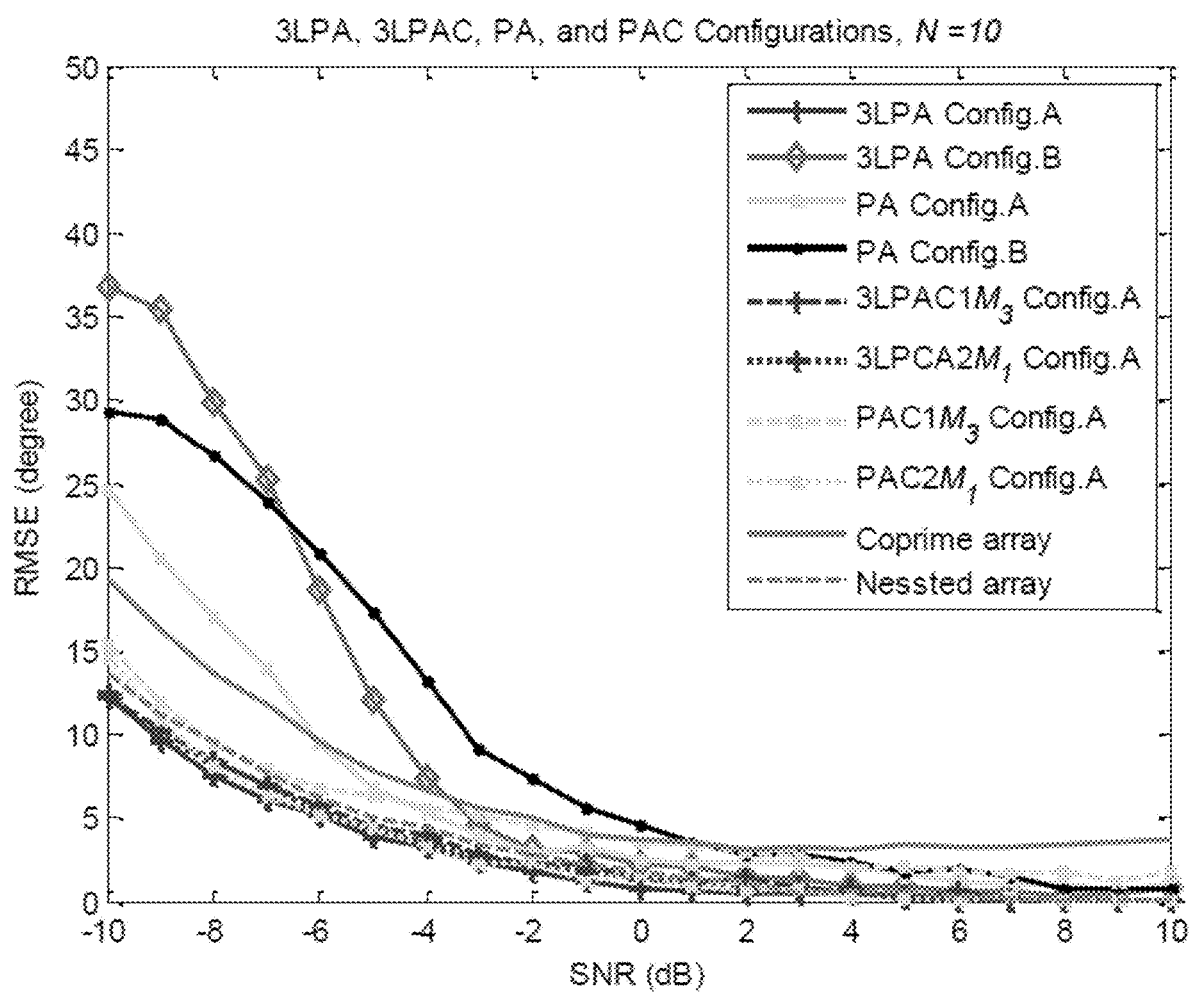
FIGS. 6B illustrates as a function of the SNR using Lasso with K=12 sources, L=1000 samples, and N=10 SNR for 3LPA, PA, 3LPAC, and PAC configurations.

The RMSE of the configurations presented in Table 2 is plotted versus the SNR in FIGS. 6A-B using the MUSIC and Lasso algorithms for K=12 sources. As shown in FIG. 6B, it is evident that the DOA estimation performance using the MUSIC algorithm is improved as the SNR increases. The nested array achieves the best performance because it achieves the largest number of consecutive lags. The coprime array has the worst RMSE due to the lack in the number of consecutive lags. The performance of all configurations agree with that in Table 2 where configurations with equal numbers of lags have realized similar RMSE.

After compression, the RMSE for all corresponding configurations have been improved. Both 3LPAC1M$_3$ and 3LPAC2M$_1$ Config.A realize similar RMSE which is the minimum RMSE among all proposed configurations since they had the largest number of consecutive lags.

With the Lasso algorithm, a larger DOF can be realized as FIG. 6B shows because all unique lags can be exploited. The performance of the first 3LPA configuration is better than that of PA configurations since it has more unique lags. Moreover, the performance of this array is improved more after applying compression but at a high SNR. The improvement and the degradation in the RMSE of the PAC configurations is due to the large number of unique lags and the physical antenna locations (close) which causes imperfect estimation for some lags. At high SNR, the minimum RMSE is realized with nested array among all scenarios. Having very close antenna elements also affects the performance of the nested array, although it has the largest number of unique lags among all considered configurations.

Figure 7A:
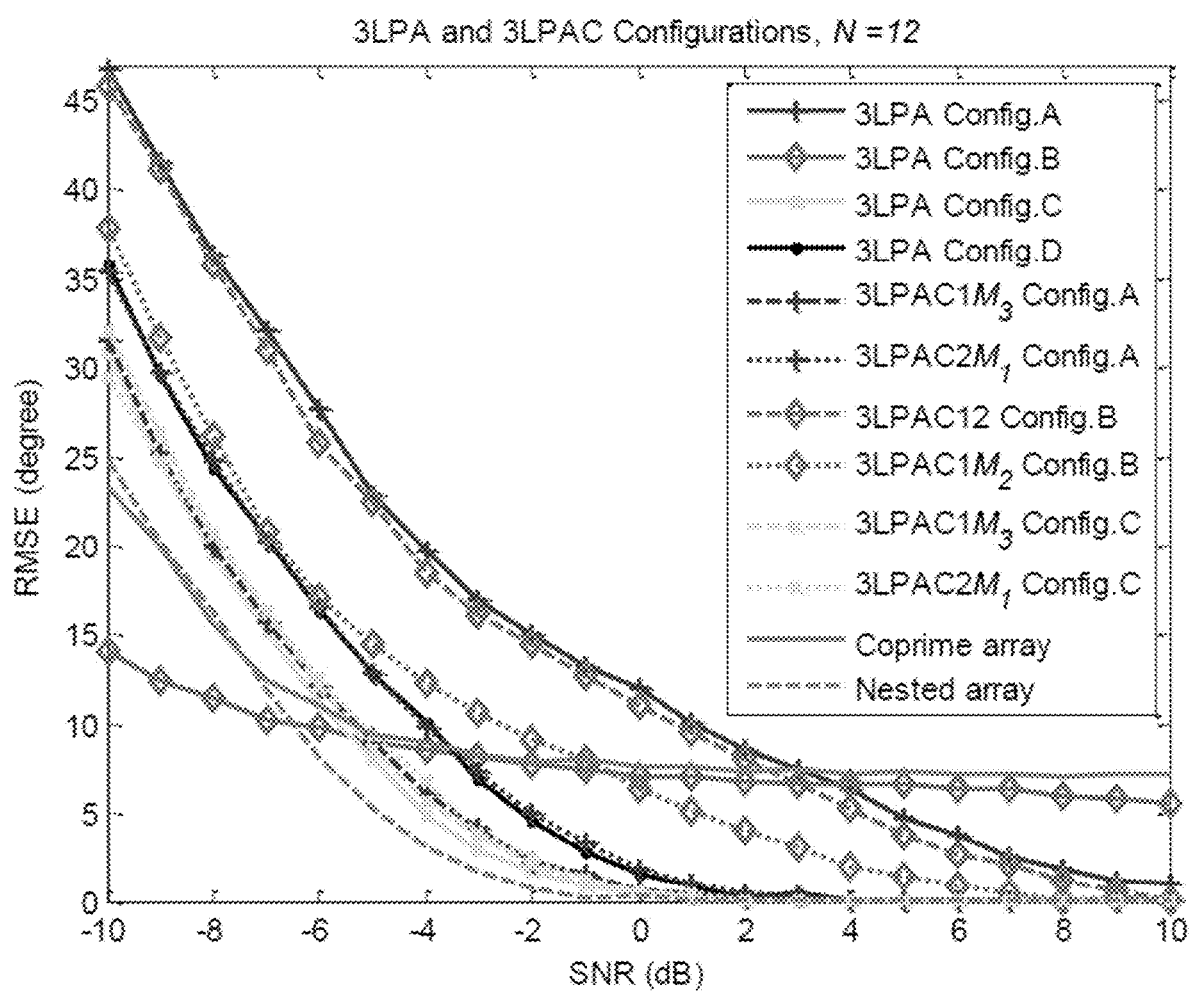
FIGS. 7A illustrates RMSE as a function of the SNR using MUSIC for 3LPA and 3LPAC with K=15 sources, L=1000 samples, and N=12.
Figure 7B:
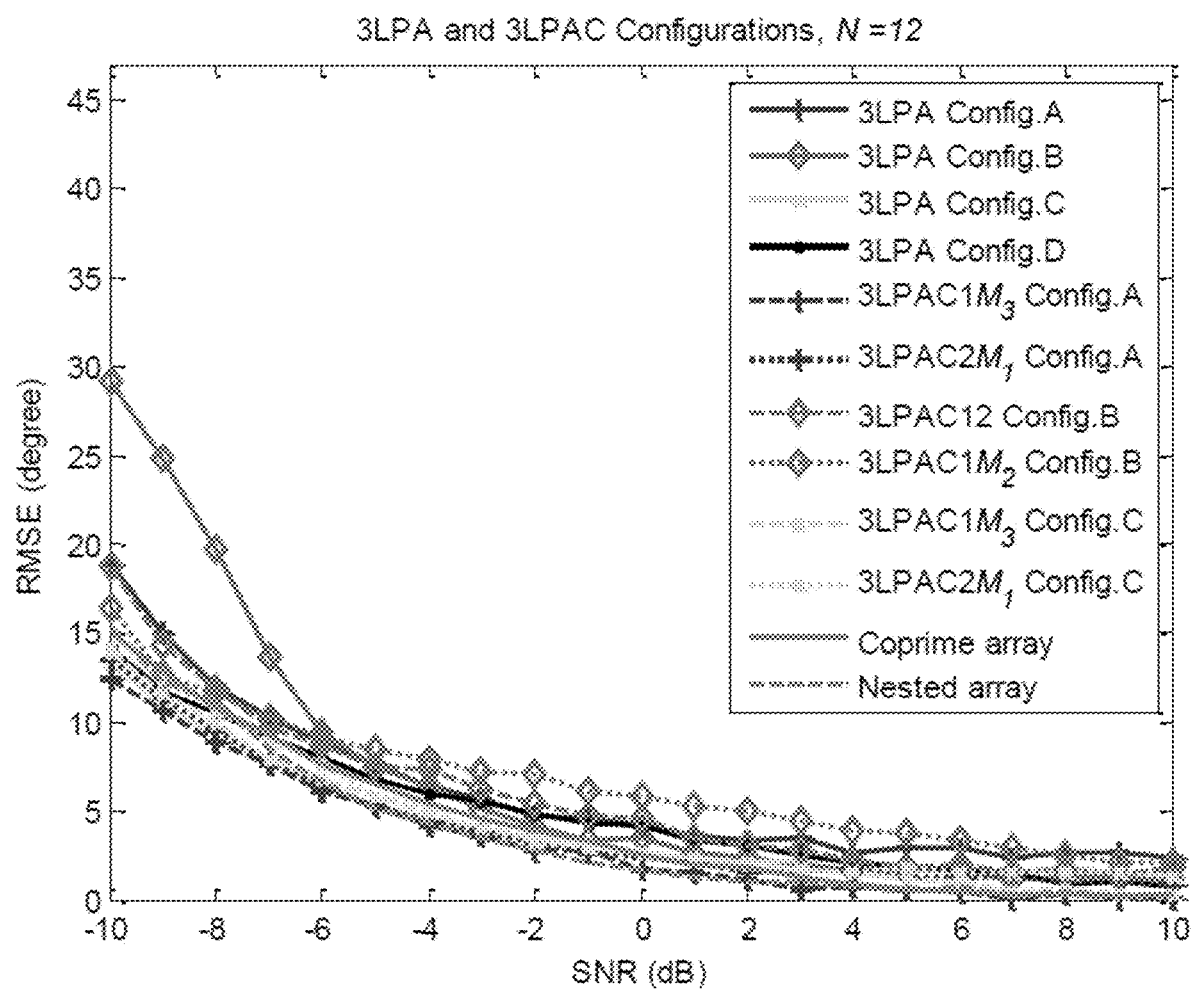
FIGS. 7B illustrates RMSE as a function of the SNR using Lasso for 3LPA and 3LPAC with K=15 sources, L=1000 samples, and N=12.

Similarly, the RMSE of the 3LPA configurations presented in Table 3 is plotted versus the SNR in FIGS. 7A-B for K=15 sources using the MUSIC and Lasso algorithms. Some configurations with equal numbers of consecutive lags attain similar RMSE but at a high SNR (3 and 10 dB, for example) in the case of the MUSIC algorithm, see FIG. 7B. Although, compressing the inter-element spacing led to a higher number of consecutive lags, the improvement in the RMSE is not significant in the 3LPA Config.C and it's compressed versions due to the small difference in the number of consecutive lags. This is not the case with the remaining configurations. Generally speaking, the results match what was summarized in Table 3.

Using the Lasso algorithm, the improvement in the RMSE of the compressed versions of the 3LPA Config.A is very clear as FIG. 7B demonstrates as a result of the large improvement in the number of unique lags. Those configurations had six unique lags more compared with the corresponding 3LPA configuration. The performances of the compressed versions of the third 3LPA in the legend are affected differently. A reduction in the RMSE cane be related to the enhancement in the number of unique lags, while degradation in the RMSE is as a result of wrong estimation for some lags and the corresponding measurement.

Figure 8A:
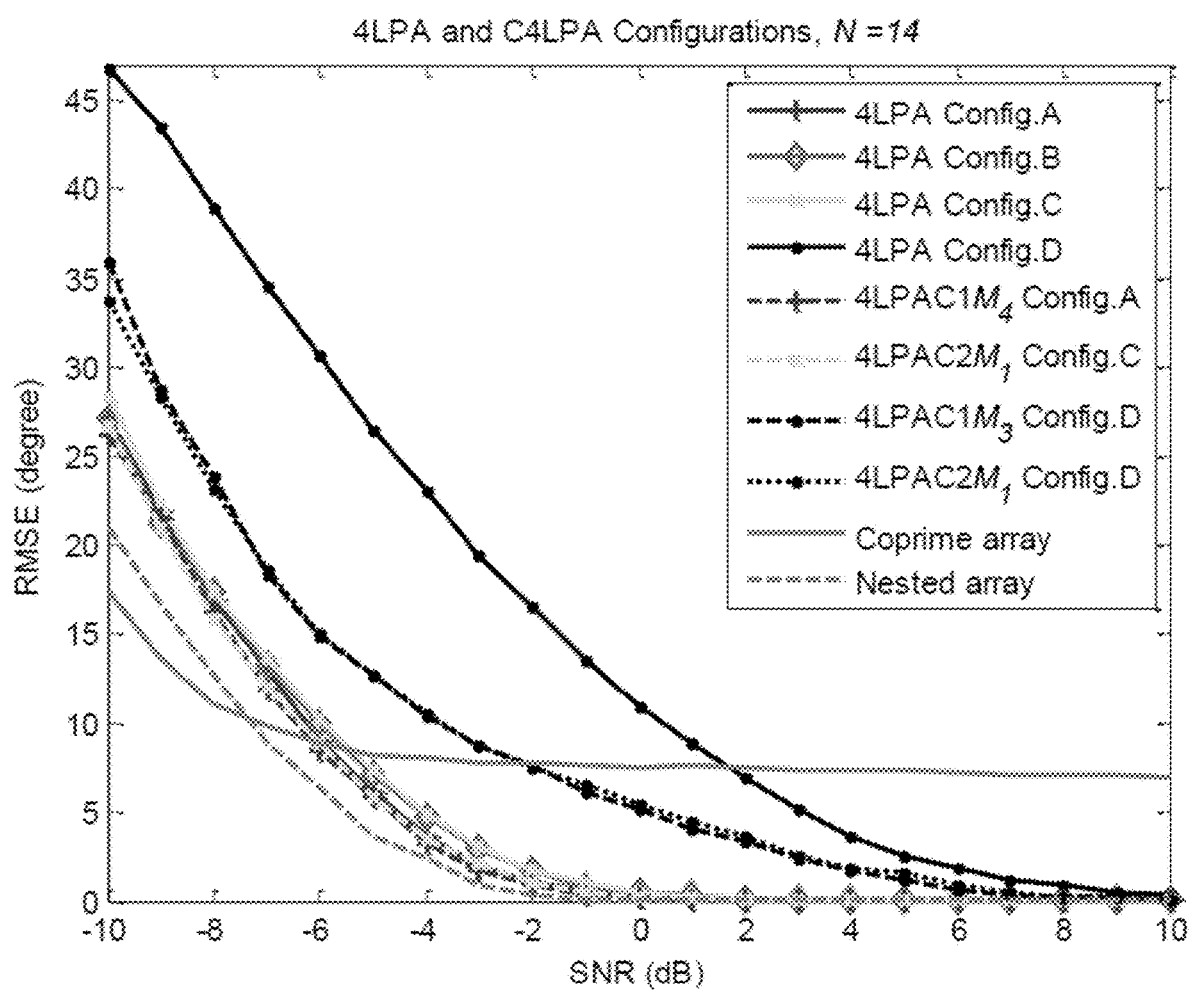
FIGS. 8A illustrates RMSE as a function of the SNR using MUSIC for 4LPA and 4LPAC with K=16 sources, L=1000, and N=14.
Figure 8B:
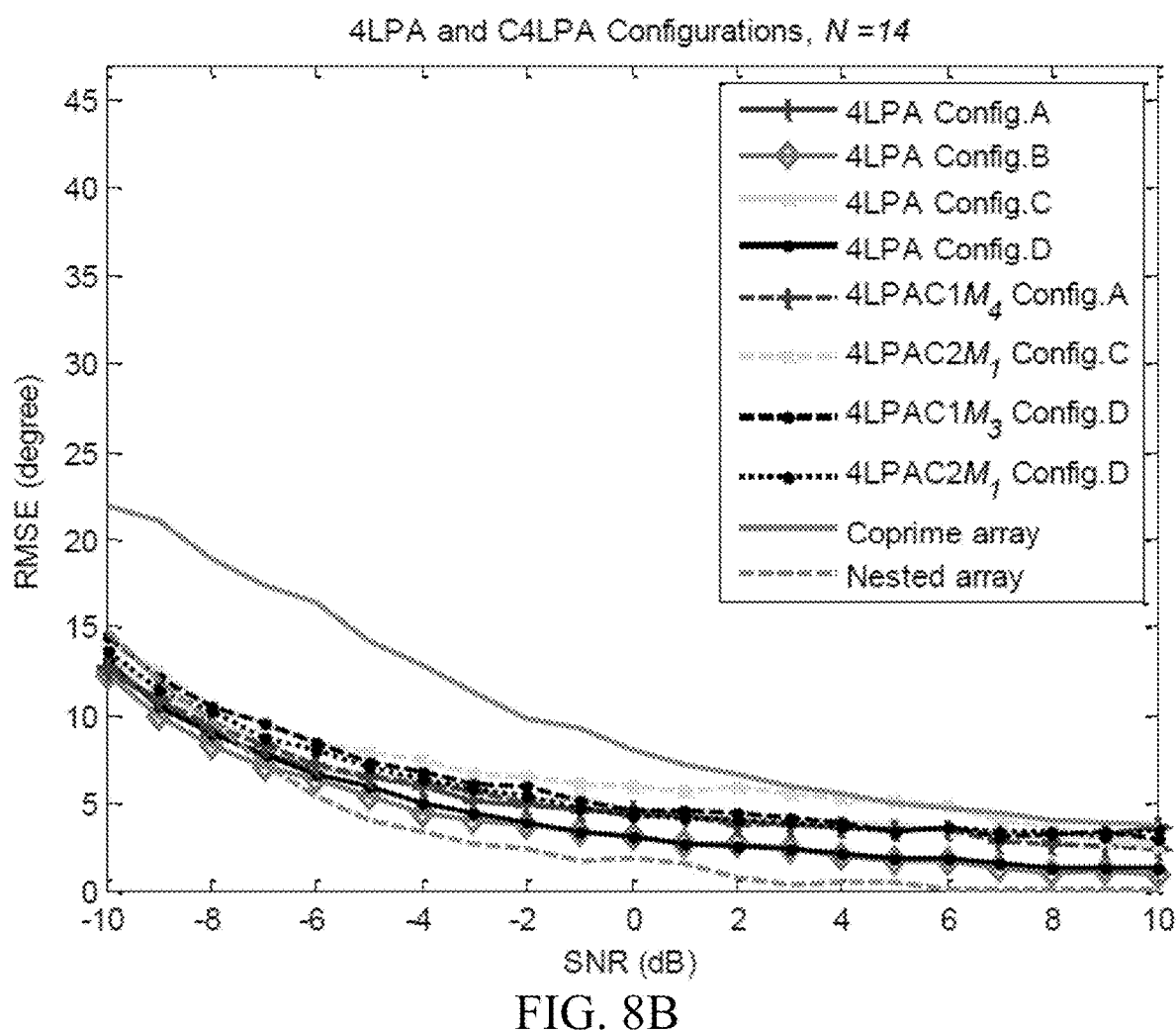
FIGS. 8B illustrates RMSE as a function of the SNR using Lasso for 4LPA and 4LPAC with K=16 sources, L=1000, and N=14.

The RMSE in degree of the 4LPA configurations presented in Table 4 is plotted versus the SNR in FIGS. 8A-B for K=16 sources and N=14 elements. FIG. 8A shows the RMSE as a function of the SNR using the MUSIC algorithm. The same behaviors are realized where the RMSE depends on how many consecutive lags are generated by the corresponding array configuration. Compressing the inter-element spacing of a subarray reduces the RMSE of the resultant 4LPAC configuration. Configurations with the largest (nested arrays) and the smallest (coprime arrays) number of consecutive lags achieve the minimum and the maximum RMSE, respectively. Others require large SNR arounds 10 dB to realize their minimum RMSEs.

The first three 4LPA configurations have equivalent difference co-arrays according to Table 4. Though, the RMSE of the second array using Lasso algorithm as shown in FIG. 8B is smaller because the antenna elements are not close to each other. The other two configurations have relatively similar structures where closer antenna elements lead to imperfect estimation for some lags. In addition, the fourth configuration presented in FIG. 8($b$) has an RMSE similar to that of second configuration because of the same reason. There is a slight improvement in compressed version of the 4LPA Config.A. Although the 4LPAC configurations have enhanced difference co-arrays, wrong estimation for some lags make the performance worse.

For RMSE versus number of samples the effect of the number of samples on the RMSE for the configurations were evaluated as discussed above and considered. Grid refinement is with δ=11 samples. The same number of sources is used and SNR=0 dB.

Figure 9:
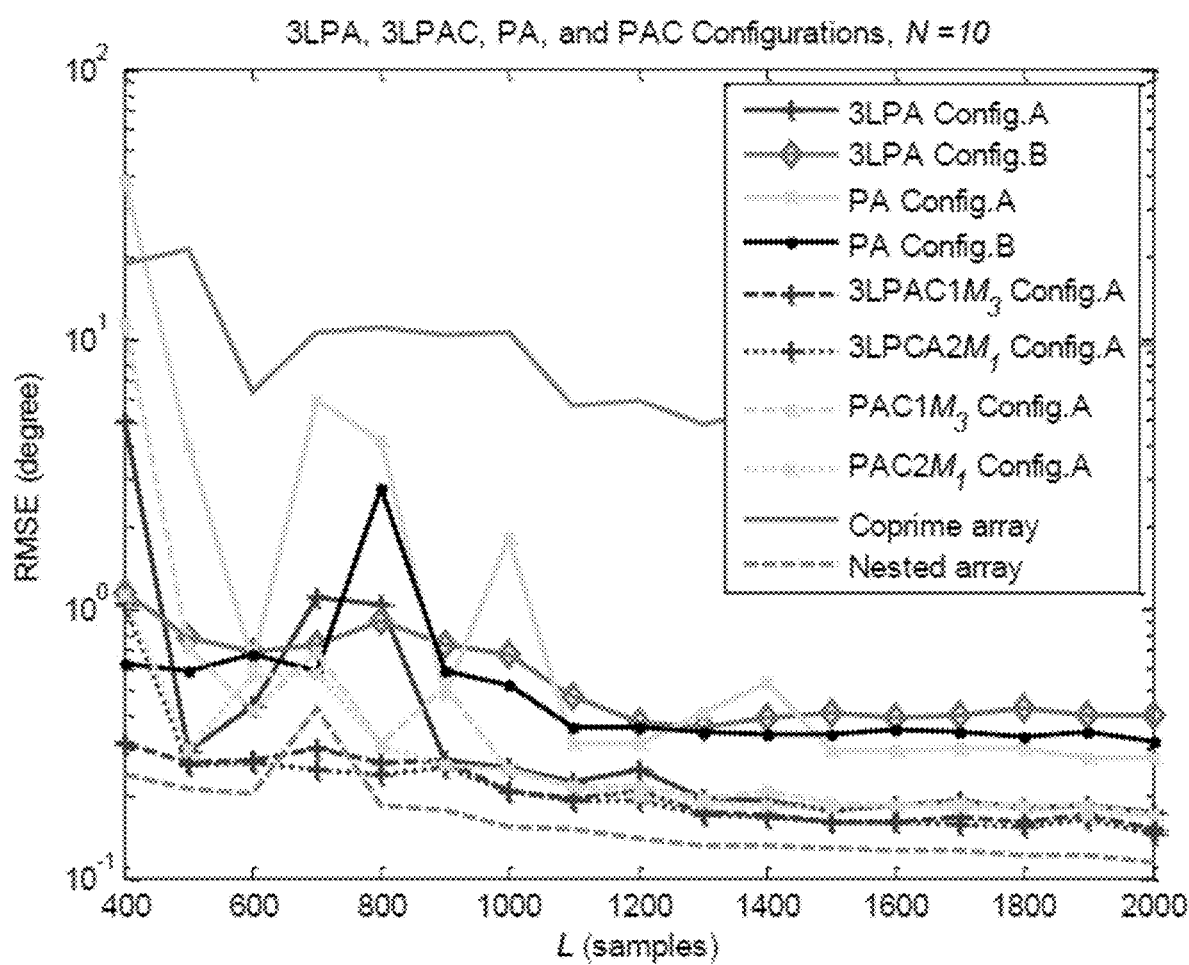
FIG. 9 illustrates RMSE as a function of the number of samples using MUSIC algorithm for 3LPA, PA, 3LPAC and PAC with K=12 sources, SNR=0 dB, and N=10.

The RMSE using the MUSIC algorithm versus the number of samples of 3LPA and PA configurations presented in Table 2 is plotted in FIG. 9. It is apparent the performance is enhanced with increase of the number of samples. There are some oscillation from 700-1000 samples in the performances of some configurations which vanishes as the number of samples is increased. Compressing the inter-element spacing lead to a significant reduction in the oscillation due to the enhancement in the number of consecutive lags. The number of sources is larger than the DOF realized by coprime array, this is the reason behind having large and unsmoothed RMSE.

Figure 10:
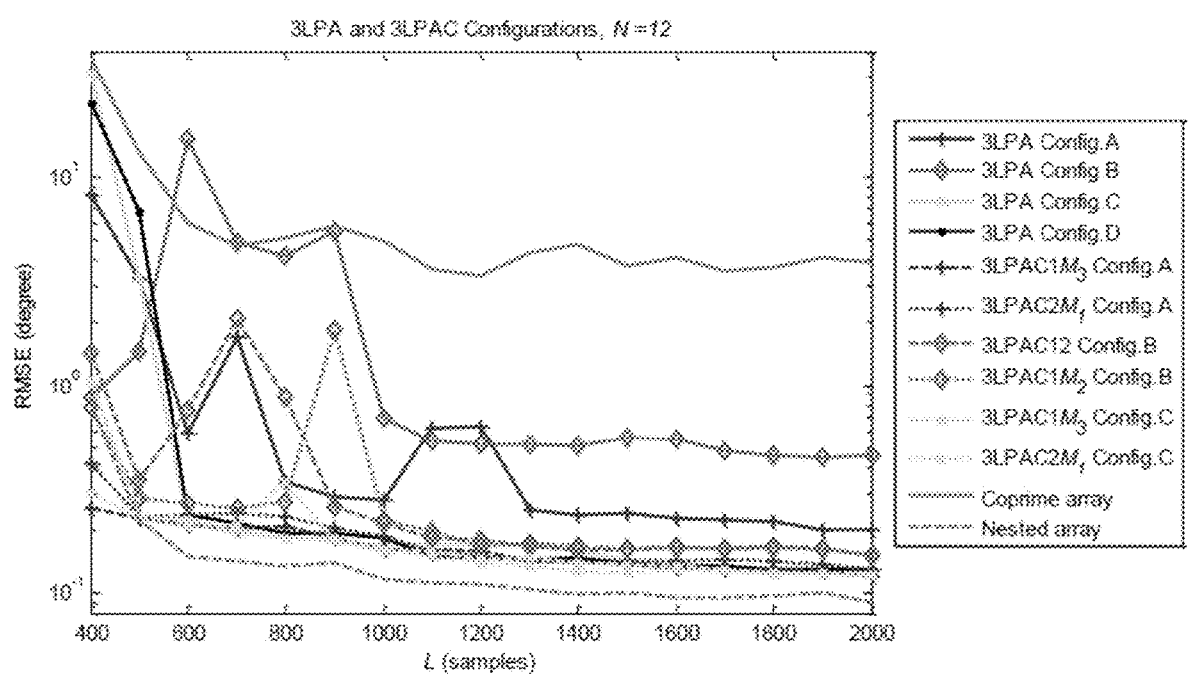
FIG. 10 illustrates RMSE as a function of the number of samples using MUSIC algorithm for 3LPA and 3LPAC with K=15 sources, SNR=0 dB, and N=12.

The RMSE versus the number of samples of 3LPA configurations presented in Table 3 is plotted in FIG. 10 using the MUSIC algorithm. Generally speaking, the RMSE improves by increasing the number of samples. According to the last column in Table 3, the RMSE is enhanced as the number of consecutive lags increases as shown in FIG. 10. Due to the number of consecutive lags lacking, oscillations appear in the RMSE when L=500–900 samples for certain configurations.

Figure 11:
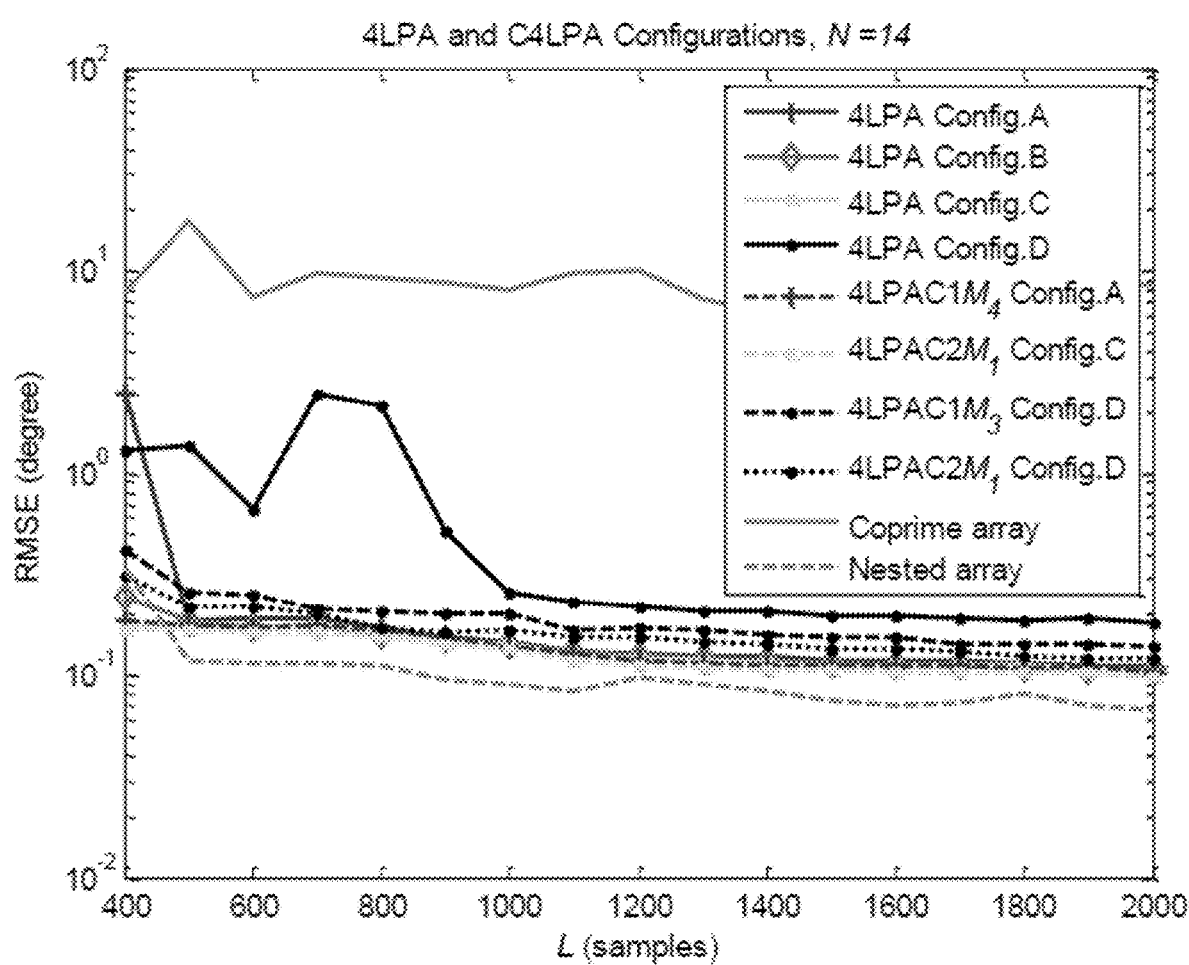
FIG. 11 illustrates RMSE as a function of the number of samples MUSIC algorithm for 4LPA and 4LPAC with K=16 sources, SNR=0 dB, and N=14.

Finally, the effect of the number of samples on the RMSE is investigated when using 4LPA and 4LPAC configurations presented, as shown in Table 4. The RMSE versus L is plotted FIG. 11 when the MUSIC algorithm is exploited. The RMSE is reduced as the number of samples increases for all configurations. The RMSE of the 4LPA that has the minimum number of consecutive lags has some oscillation when L=700 and 900 samples. This oscillation does not appear after applying compression. Unstable and large RMSE is realized with coprime array due to the lack in the number of consecutive lags.

As the number of antenna elements increases, larger DOF is expected. Assuming that K=27 sources impinge on the 3LPA and 3LPAC configurations presented in Table 3. Only one configuration has got enough DOF to resolve all 27 sources when the MUSIC algorithm is used as FIGS. 4A-L demonstrate. On the other hand, more configurations can detect all sources using the Lasso algorithm due to the higher DOFs achieved by exploiting all unique lags as depicted in FIGS. 4A-L. Although the nested array and 3LPAC have hole free difference co-arrays, the nested array has 22 lags more than the proposed 3LPAC but it requires a larger aperture size of 11$d$ as illustrated in Table 3. It is evident that the Lasso algorithm provides large values at the estimated angles.

The present invention as discussed hereinabove is directed to sparse DOA estimation based on MLPA and MLPAC configurations. The MLPA configuration uses multiple uniform linear subarrays where the number of elements is pairwise coprime integers. The array has closed form expressions for the antenna locations and the corresponding aperture size. The spacing among the subarrays is adjusted such that the subarrays only share the first antenna element. There are several ways to select the number of elements in the subarrays and to select the spacing in between. Although few missing lags or holes appear in the difference co-array, large DOFs can be achieved. Thus, the invention is further directed to MLPAC configurations that incorporate compressing the inter-element spacing of one subarray under fixed N and D. Those arrays can realize a hole free difference co-array by properly selecting the compression factor and the intended subarray. The effectiveness of the proposed configurations have been investigated through simulation for DOA estimation.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A method for determining the location of a signal transmitter, comprising:
   receiving a signal from an antenna array in the form of a multi-level prime array (MLPA) or a multi-level prime array compressed (MLPAC), at a receiver,
   analyzing the signal with an analyzer having circuitry configured to determine a signal emitter location based on a direction of arrival estimation of the signal,
   wherein the antenna array has a plurality of elements positioned at positions $\mathbb{P}$ according to:

$$\mathbb{P} = \bigcup_{i=1}^{N_p} \{k_i \mathcal{S}_i d \mid 0 \le k_i \le M_i - 1, \mathcal{S}_i \ne M_i\}$$

wherein $N_p$ is a coprime integer value and $m=[M_1, M_2 \ldots M_{N_p}]$ are vectors of an $N_p$ number of $M_i$ antenna elements and $\mathcal{S}_i d$ are units of half-wavelength.

2. The method of claim 1, wherein the total number of antenna elements N is:

$$N = \sum_{i=1}^{N_p} M_i - (N_p - 1).$$

3. The method of claim 2, wherein the aperture size is:
$D=\max(\mathcal{S}_{N_p-1}(M_{N_p-1}-1)d, \mathcal{S}_{N_p}(M_{N_p}-1)_d)$
where $d=\lambda/2$.

4. A method for generating a multilevel prime array configuration for an antenna array used in direction-of-arrival estimation, comprising:
   providing an antenna array having at least one linear subarray, wherein the at least one subarray includes $M_i$ antenna elements;
   determining an inter-element spacing between the antenna elements based on multiple units of half-wavelength, $\mathcal{S}_i d$, wherein $\mathcal{S}_i \in m$ and $d=\lambda/2$ representing a unit inter-element spacing with $\lambda$ being the carrier wavelength; and
   determining positions $\mathbb{P}$ of the antenna elements in the antenna array based on:

$$\mathbb{P} = \bigcup_{i=1}^{N_p} \{k_i \mathcal{S}_i d \mid 0 \le k_i \le M_i - 1, \mathcal{S}_i \ne M_i\}$$

wherein $N_p$ is a coprime integer value and $m=[M_1, M_2, \ldots, M_{N_p}]$ are vectors of an $N_p$ number of $M_i$ antenna elements.

5. The method according to claim 4, wherein the step of determining the inter-element spacing includes compressing the inter-element spacing of at least one subarray to increase degree of freedom without scarifying the antenna elements and aperture size.

6. The method according to claim 4, wherein the step of providing the antenna array having at least N linear subarrays includes providing a total number of antenna elements N based on:

$$N = \sum_{i=1}^{N_p} M_i - (N_p - 1).$$

7. A method according to claim 4, further comprising the step of:
   determining an aperture size D of the antenna array in response to the inter-element spacing based on
   $D=\max(\mathcal{S}_{N_p-1}(M_{N_p-1}-1)d, \mathcal{S}_{N_p}(M_{N_p}-1)_d)$.

8. A method according to claim 7, further comprising the step of:
   compressing the inter-element spacing by a factor of c based on $$(M_i, c) \leftarrow \underset{M_i, c \in \mathbb{N}^+}{\mathrm{argmax}} \{l_c(m, \mathbb{S})\}$$

subject to:

$$M_i = c\check{M}_i, \forall\, i \in \{1, 2, \ldots, N_p\}.$$

* * * * *